(12) United States Patent
Landers

(10) Patent No.: US 12,171,192 B1
(45) Date of Patent: Dec. 24, 2024

(54) GRAPHICAL SHEPHERDING

(71) Applicant: GPSip, Inc., Oshkosh, WI (US)

(72) Inventor: Rodney P. Landers, Stillwater, MN (US)

(73) Assignee: GPSip, Inc., Oshkosh, WI (US)

( * ) Notice: Subject to any disclaimer, the term of this patent is extended or adjusted under 35 U.S.C. 154(b) by 383 days.

(21) Appl. No.: 17/670,687

(22) Filed: Feb. 14, 2022

(51) Int. Cl.
  *A01K 15/02* (2006.01)

(52) U.S. Cl.
  CPC .................................. *A01K 15/023* (2013.01)

(58) Field of Classification Search
  CPC ...................................................... A01K 15/023
  See application file for complete search history.

(56) References Cited

U.S. PATENT DOCUMENTS

| | | |
|---|---|---|
| 2,883,255 A | 4/1959 | Anderson |
| 3,534,337 A | 10/1970 | Martin et al. |
| 4,393,448 A | 7/1983 | Dunn et al. |
| 4,590,569 A | 5/1986 | Rogoff et al. |
| 4,611,209 A | 9/1986 | Lemelson et al. |
| 4,817,000 A | 3/1989 | Eberhardt |
| 4,823,366 A | 4/1989 | Williams |
| 4,898,120 A | 2/1990 | Brose |
| 4,965,568 A | 10/1990 | Atalla et al. |
| 4,967,696 A | 11/1990 | Tobias |
| 4,999,782 A | 3/1991 | BeVan |
| 5,043,736 A | 8/1991 | Darnell et al. |
| 5,046,453 A | 9/1991 | Vinci |
| 5,067,441 A | 11/1991 | Weinstein |
| 5,132,871 A | 7/1992 | Densham et al. |
| 5,191,341 A | 3/1993 | Gouard et al. |

(Continued)

FOREIGN PATENT DOCUMENTS

| | | |
|---|---|---|
| DE | 2020/04011942 U1 | 12/2004 |
| EP | 0160072 A1 | 11/1985 |

(Continued)

OTHER PUBLICATIONS

"Boundary Plus Computer Collar Unit Owner's Manual", Invisible Fence, 10 pages.

(Continued)

*Primary Examiner* — Daryl C Pope
(74) *Attorney, Agent, or Firm* — Albert W. Watkins

(57) ABSTRACT

An assisted guidance region has a plurality of zones, each with an associated set of behavioral guidance characteristics. Behavioral guidance is extended to a wayward dog who has moved outside of an alert zone by providing stimuli to shepherd the dog back in. Calculation of relative movement direction outside of and relative to the alert zone is preferably based upon reading a future position guidance zone value located in a path of sequential future position guidance zone values stored in said data table that are defined in direction by a displacement from said second represented current position relative to said first represented current position and defined in location sequentially extending away from both of said second represented position and said first represented current position. In some embodiments, two or more calculation techniques are selected from or used in combination to determine relative movement direction.

13 Claims, 11 Drawing Sheets

(56) References Cited

U.S. PATENT DOCUMENTS

| | | |
|---|---|---|
| 5,351,059 A | 9/1994 | Tsuyuki |
| 5,351,653 A | 10/1994 | Marischen et al. |
| 5,353,744 A | 10/1994 | Custer |
| 5,355,140 A | 10/1994 | Slavin et al. |
| 5,355,511 A | 10/1994 | Hatano et al. |
| 5,381,129 A | 1/1995 | Boardman |
| 5,389,934 A | 2/1995 | Kass |
| 5,408,956 A | 4/1995 | Quigley |
| 5,445,178 A | 8/1995 | Feuer |
| 5,450,329 A | 9/1995 | Tanner |
| 5,491,486 A | 2/1996 | Welles, II et al. |
| 5,533,959 A | 7/1996 | Newman et al. |
| 5,549,412 A | 8/1996 | Malone |
| 5,568,119 A | 10/1996 | Schipper et al. |
| 5,587,904 A | 12/1996 | Ben-Yair et al. |
| 5,594,425 A | 1/1997 | Ladner et al. |
| 5,614,670 A | 3/1997 | Nazarian et al. |
| 5,636,597 A | 6/1997 | Van Curen et al. |
| 5,669,061 A | 9/1997 | Schipper |
| 5,685,786 A | 11/1997 | Dudley |
| 5,687,093 A | 11/1997 | Long et al. |
| 5,719,771 A | 2/1998 | Buck et al. |
| 5,721,685 A | 2/1998 | Holland et al. |
| 5,742,233 A | 4/1998 | Hoffman et al. |
| 5,751,612 A | 5/1998 | Donovan et al. |
| 5,774,876 A | 6/1998 | Woolley et al. |
| 5,777,451 A | 7/1998 | Kobayashi et al. |
| 5,791,294 A | 8/1998 | Manning |
| 5,804,810 A | 9/1998 | Woolley et al. |
| 5,815,077 A | 9/1998 | Christiansen |
| 5,825,283 A | 10/1998 | Camhi |
| 5,857,433 A | 1/1999 | Files |
| 5,868,100 A | 2/1999 | Marsh |
| 5,870,741 A | 2/1999 | Kawabe et al. |
| 5,875,183 A | 2/1999 | Nitadori |
| 5,892,454 A | 4/1999 | Schipper et al. |
| 5,900,736 A | 5/1999 | Sovik et al. |
| 5,905,461 A | 5/1999 | Neher |
| 5,911,199 A | 6/1999 | Farkas et al. |
| 5,933,079 A | 8/1999 | Frink |
| 5,947,636 A | 9/1999 | Mara |
| 5,949,350 A | 9/1999 | Girard et al. |
| 5,952,561 A | 9/1999 | Jaselskis et al. |
| 5,959,568 A | 9/1999 | Woolley |
| 5,959,577 A | 9/1999 | Fan et al. |
| 5,963,130 A | 10/1999 | Schlager et al. |
| 5,978,749 A | 11/1999 | Likins, Jr. et al. |
| 5,982,291 A | 11/1999 | Williams et al. |
| 5,986,604 A | 11/1999 | Nichols et al. |
| 6,016,713 A | 1/2000 | Hale |
| 6,041,582 A | 3/2000 | Tiede et al. |
| 6,043,747 A | 3/2000 | Altenhofen |
| 6,043,748 A | 3/2000 | Touchton et al. |
| 6,072,396 A | 6/2000 | Gaukel |
| 6,079,367 A | 6/2000 | Stapelfeld et al. |
| 6,100,806 A | 8/2000 | Gaukel |
| 6,114,957 A | 9/2000 | Westrick et al. |
| 6,122,601 A | 9/2000 | Swanson et al. |
| 6,172,640 B1 | 1/2001 | Durst et al. |
| 6,173,321 B1 | 1/2001 | Peterson et al. |
| 6,184,790 B1 | 2/2001 | Gerig |
| 6,225,890 B1 | 5/2001 | Murphy |
| 6,230,661 B1 | 5/2001 | Yarnall, Jr. et al. |
| 6,232,874 B1 | 5/2001 | Murphy |
| 6,232,880 B1 | 5/2001 | Anderson et al. |
| 6,232,916 B1 | 5/2001 | Grillo et al. |
| 6,236,358 B1 | 5/2001 | Durst et al. |
| 6,239,700 B1 | 5/2001 | Hoffman et al. |
| 6,263,836 B1 | 7/2001 | Hollis |
| 6,271,757 B1 | 8/2001 | Touchton et al. |
| 6,292,725 B1 | 9/2001 | Kageyama et al. |
| 6,301,551 B1 | 10/2001 | Piscalko et al. |
| 6,311,644 B1 | 11/2001 | Pugh |
| 6,313,791 B1 | 11/2001 | Klanke |
| 6,320,933 B1 | 11/2001 | Grodzins et al. |
| 6,353,390 B1 | 3/2002 | Beri et al. |
| 6,362,778 B2 | 3/2002 | Neher |
| 6,388,612 B1 | 5/2002 | Neher |
| 6,404,338 B1 | 6/2002 | Koslar |
| 6,415,742 B1 | 7/2002 | Lee et al. |
| 6,421,001 B1 | 7/2002 | Durst et al. |
| 6,421,608 B1 | 7/2002 | Motoyama et al. |
| 6,431,122 B1 | 8/2002 | Westrick et al. |
| 6,434,372 B1 | 8/2002 | Neagley et al. |
| 6,437,743 B1 | 8/2002 | Mintz et al. |
| 6,441,778 B1 | 8/2002 | Durst et al. |
| 6,480,147 B2 | 11/2002 | Durst et al. |
| 6,484,079 B2 | 11/2002 | Buckelew et al. |
| 6,487,992 B1 | 12/2002 | Hollis |
| 6,497,153 B1 | 12/2002 | Hoskinson et al. |
| 6,518,919 B1 | 2/2003 | Durst et al. |
| 6,519,530 B2 | 2/2003 | Crockett et al. |
| 6,520,715 B1 | 2/2003 | Smith |
| 6,561,137 B2 | 5/2003 | Oakman |
| 6,577,141 B2 | 6/2003 | Gandrud |
| 6,581,546 B1 | 6/2003 | Dalland et al. |
| 6,600,422 B2 | 7/2003 | Barry et al. |
| 6,624,754 B1 | 9/2003 | Hoffman et al. |
| 6,657,544 B2 | 12/2003 | Barry et al. |
| 6,700,492 B2 | 3/2004 | Touchton et al. |
| 6,700,533 B1 | 3/2004 | Werb et al. |
| 6,711,535 B2 | 3/2004 | Ford et al. |
| 6,718,248 B2 | 4/2004 | Lu et al. |
| 6,747,555 B2 | 6/2004 | Fellenstein et al. |
| 6,748,902 B1 | 6/2004 | Boesch et al. |
| 6,762,684 B1 | 7/2004 | Camhi |
| 6,838,991 B2 | 1/2005 | Frankewich, Jr. |
| 6,847,892 B2 | 1/2005 | Zhou et al. |
| 6,857,016 B1 | 2/2005 | Motoyama et al. |
| 6,859,171 B2 | 2/2005 | Durst et al. |
| 6,868,100 B2 | 3/2005 | Larson et al. |
| 6,892,131 B2 | 5/2005 | Coffee et al. |
| 6,903,682 B1 | 6/2005 | Maddox |
| 6,915,216 B2 | 7/2005 | Troxler et al. |
| 6,919,803 B2 | 7/2005 | Breed |
| 6,923,146 B2 | 8/2005 | Kobitz et al. |
| 6,943,701 B2 | 9/2005 | Zeineh |
| 6,961,659 B2 | 11/2005 | Motoyama et al. |
| RE38,910 E | 12/2005 | Troxler et al. |
| 6,995,667 B2 | 2/2006 | He et al. |
| 7,000,570 B2 | 2/2006 | Napolez et al. |
| 7,002,472 B2 | 2/2006 | Stratmoen et al. |
| 7,015,817 B2 | 3/2006 | Copley et al. |
| 7,034,683 B2 | 4/2006 | Ghazarian |
| 7,034,695 B2 | 4/2006 | Troxler |
| 7,038,590 B2 | 5/2006 | Hoffman et al. |
| 7,061,385 B2 | 6/2006 | Fong et al. |
| 7,113,126 B2 | 9/2006 | Durst et al. |
| 7,142,167 B2 | 11/2006 | Rochelle et al. |
| 7,164,354 B1 | 1/2007 | Panzer |
| 7,164,986 B2 | 1/2007 | Humphries et al. |
| 7,171,187 B2 | 1/2007 | Haave et al. |
| 7,173,535 B2 | 2/2007 | Bach et al. |
| 7,196,621 B2 | 3/2007 | Kochis |
| 7,219,024 B2 | 5/2007 | Gamache et al. |
| 7,236,798 B2 | 6/2007 | Beuck |
| 7,239,150 B2 | 7/2007 | Troxler et al. |
| 7,259,718 B2 | 8/2007 | Patterson et al. |
| 7,313,759 B2 | 12/2007 | Sinisi |
| 7,319,397 B2 | 1/2008 | Chung et al. |
| RE40,073 E | 2/2008 | Breed |
| 7,328,671 B2 | 2/2008 | Kates |
| 7,345,588 B2 | 3/2008 | Gerig |
| 7,376,457 B2 | 5/2008 | Ross |
| 7,376,530 B2 | 5/2008 | Bienvenu et al. |
| 7,385,499 B2 | 6/2008 | Horton et al. |
| 7,394,390 B2 | 7/2008 | Gerig |
| 7,441,516 B2 | 10/2008 | Sharpe |
| 7,468,659 B2 | 12/2008 | Haave et al. |
| 7,477,155 B2 | 1/2009 | Bach et al. |
| 7,512,493 B2 | 3/2009 | Morgan et al. |
| 7,518,522 B2 | 4/2009 | So |
| 7,538,679 B2 | 5/2009 | Shanks |
| 7,554,441 B2 | 6/2009 | Viegers et al. |

(56) References Cited

U.S. PATENT DOCUMENTS

| | | |
|---|---|---|
| 7,663,502 B2 | 2/2010 | Breed |
| 7,664,483 B2 | 2/2010 | Annoni et al. |
| 7,677,204 B1 | 3/2010 | James |
| 7,707,085 B2 | 4/2010 | Sakurai et al. |
| 7,764,228 B2 | 7/2010 | Durst et al. |
| 7,786,876 B2 | 8/2010 | Troxler |
| 7,801,506 B2 | 9/2010 | Haave et al. |
| 7,822,817 B2 | 10/2010 | Motoyama et al. |
| 7,830,257 B2 | 11/2010 | Hassell |
| 7,848,905 B2 | 12/2010 | Troxler et al. |
| 7,856,947 B2 | 12/2010 | Giunta |
| 7,920,066 B2 | 4/2011 | Troxler |
| 7,955,513 B2 | 6/2011 | Carr |
| 7,961,094 B2 | 6/2011 | Breed |
| 8,065,074 B1 | 11/2011 | Liccardo |
| 8,112,242 B2 | 2/2012 | Troxler |
| 8,115,642 B2 | 2/2012 | Thompson et al. |
| 8,149,110 B2 | 4/2012 | Troxler |
| 8,155,871 B2 | 4/2012 | Lohi et al. |
| 8,159,338 B2 | 4/2012 | Breed |
| 8,237,575 B2 | 8/2012 | Maclean, III et al. |
| 8,274,396 B2 | 9/2012 | Gurley et al. |
| 8,291,867 B2 | 10/2012 | Blizzard |
| 8,297,233 B2 | 10/2012 | Rich et al. |
| 8,428,913 B2 | 4/2013 | Troxler |
| 8,531,289 B2 | 9/2013 | Scalisi et al. |
| 8,571,671 B2 | 10/2013 | Shah et al. |
| 8,624,723 B2 | 1/2014 | Troxler |
| 8,726,846 B2 | 5/2014 | Dutcher et al. |
| 8,726,847 B2 | 5/2014 | Gurley et al. |
| 8,757,098 B2 | 6/2014 | So et al. |
| 8,779,925 B2 | 7/2014 | Rich et al. |
| 8,797,141 B2 | 8/2014 | Best et al. |
| 8,838,260 B2 | 9/2014 | Pachet et al. |
| 8,839,744 B1 | 9/2014 | Bianchi et al. |
| 8,851,019 B2 | 10/2014 | Jesurum |
| 8,955,462 B1 | 2/2015 | Golden |
| 8,957,812 B1 | 2/2015 | Hill et al. |
| 9,015,231 B1 | 4/2015 | Hodgman et al. |
| 9,072,278 B2 | 7/2015 | Chortyk-White et al. |
| 9,101,113 B2 | 8/2015 | Rich et al. |
| 9,137,971 B2 | 9/2015 | Gurley et al. |
| 9,161,515 B2 | 10/2015 | Dutcher et al. |
| 9,226,479 B2 | 1/2016 | Bianchi et al. |
| 9,265,015 B2 | 2/2016 | Aiuto et al. |
| 9,326,486 B2 | 5/2016 | Namm |
| 9,332,734 B1 | 5/2016 | Hege |
| 9,439,396 B2 | 9/2016 | Namm |
| 9,538,329 B1 | 1/2017 | Vivathana |
| 9,552,736 B2 | 1/2017 | Taveira |
| 9,615,545 B2 | 4/2017 | Rich et al. |
| 9,640,079 B1 | 5/2017 | Moravek et al. |
| 9,648,849 B1 | 5/2017 | Vivathana |
| 9,654,925 B1 | 5/2017 | Solinsky et al. |
| 9,674,684 B1 | 6/2017 | Mendelson |
| 9,728,089 B2 | 8/2017 | Marcus |
| 9,795,118 B2 | 10/2017 | Landers et al. |
| 9,848,295 B1 | 12/2017 | Mason et al. |
| 9,922,522 B2 | 3/2018 | Solinsky et al. |
| 9,924,314 B2 | 3/2018 | Solinsky et al. |
| 9,961,884 B1 | 5/2018 | Landers et al. |
| 10,064,390 B1 | 9/2018 | Landers et al. |
| 10,080,346 B2 | 9/2018 | Landers et al. |
| 10,092,203 B2 | 10/2018 | Mirov |
| 10,154,651 B2 | 12/2018 | Goetzl et al. |
| 10,165,755 B1 | 1/2019 | Landers et al. |
| 10,165,756 B1 | 1/2019 | Landers et al. |
| 10,172,325 B1 | 1/2019 | Landers et al. |
| 10,182,964 B2 | 1/2019 | Snow |
| 10,231,440 B2 | 3/2019 | Seltzer et al. |
| 10,251,371 B1 | 4/2019 | Landers et al. |
| 10,268,220 B2 | 4/2019 | McFarland et al. |
| 10,292,365 B1 | 5/2019 | Landers et al. |
| 10,342,218 B1 | 7/2019 | Landers et al. |
| 10,405,520 B2 | 9/2019 | Landers et al. |
| 10,455,810 B1 | 10/2019 | Landers et al. |
| 10,470,437 B1 | 11/2019 | Landers et al. |
| 10,514,439 B2 | 12/2019 | Seltzer |
| 10,624,319 B2 | 4/2020 | Landers et al. |
| 10,645,908 B2 | 5/2020 | Seltzer et al. |
| 10,674,709 B2 | 6/2020 | Goetzl et al. |
| 10,820,575 B2 | 11/2020 | Landers et al. |
| 10,842,128 B2 | 11/2020 | McFarland |
| 10,893,662 B1 | 1/2021 | Landers et al. |
| 10,918,087 B2 | 2/2021 | Respass et al. |
| 10,986,813 B2 | 4/2021 | Seltzer et al. |
| 11,019,807 B1 | 6/2021 | Landers et al. |
| 11,109,182 B2 | 8/2021 | Floyd et al. |
| 11,238,889 B2 | 2/2022 | Seltzer et al. |
| 11,246,291 B1 | 4/2022 | Landers et al. |
| 11,330,803 B2 | 5/2022 | Ehrman et al. |
| 11,372,077 B2 | 6/2022 | Seltzer et al. |
| 11,394,196 B2 | 7/2022 | Olszyk et al. |
| 11,470,814 B2 | 10/2022 | Goetzl et al. |
| 11,490,597 B2 | 11/2022 | Seltzer et al. |
| 11,516,994 B1 | 12/2022 | Landers |
| 11,553,692 B2 | 1/2023 | Goetzl et al. |
| 12,004,485 B1 | 6/2024 | Landers et al. |
| 2001/0026240 A1 | 10/2001 | Neher |
| 2002/0015354 A1 | 2/2002 | Buckelew |
| 2002/0017995 A1 | 2/2002 | Touchton |
| 2002/0152028 A1 | 10/2002 | Motoyama et al. |
| 2002/0180618 A1 | 12/2002 | Beri et al. |
| 2002/0196151 A1 | 12/2002 | Troxler |
| 2003/0179140 A1 | 9/2003 | Patterson et al. |
| 2003/0184450 A1 | 10/2003 | Muller et al. |
| 2003/0224772 A1 | 12/2003 | Patzer et al. |
| 2004/0036649 A1 | 2/2004 | Yaylor |
| 2004/0108939 A1 | 6/2004 | Giunta |
| 2004/0196182 A1 | 10/2004 | Unnold |
| 2005/0034683 A1 | 2/2005 | Giunta |
| 2005/0035865 A1 | 2/2005 | Brennan et al. |
| 2005/0066912 A1 | 3/2005 | Korbitz et al. |
| 2005/0143909 A1 | 6/2005 | Orwant |
| 2005/0280546 A1 | 12/2005 | Ganley et al. |
| 2006/0027185 A1 | 2/2006 | Troxler |
| 2006/0061469 A1 | 3/2006 | Jaeger et al. |
| 2006/0112901 A1 | 6/2006 | Gomez |
| 2006/0191491 A1 | 8/2006 | Nottingham et al. |
| 2006/0197672 A1 | 9/2006 | Talamas, Jr. et al. |
| 2007/0171047 A1 | 7/2007 | Goodman et al. |
| 2007/0204804 A1 | 9/2007 | Swanson et al. |
| 2007/0219705 A1 | 9/2007 | Bitar et al. |
| 2007/0229350 A1 | 10/2007 | Scalisi et al. |
| 2008/0036594 A1 | 2/2008 | Kates |
| 2008/0036610 A1 | 2/2008 | Hokuf et al. |
| 2008/0055154 A1 | 3/2008 | Martucci et al. |
| 2008/0156277 A1 | 7/2008 | Mainini et al. |
| 2008/0162034 A1 | 7/2008 | Breen |
| 2008/0186167 A1 | 8/2008 | Ramachandra |
| 2008/0186197 A1 | 8/2008 | Rochelle et al. |
| 2008/0216766 A1 | 9/2008 | Martin et al. |
| 2008/0246656 A1 | 10/2008 | Ghazarian |
| 2008/0252527 A1 | 10/2008 | Garcia |
| 2008/0278309 A1 | 11/2008 | Troxler |
| 2009/0002188 A1 | 1/2009 | Greenberg |
| 2009/0102668 A1 | 4/2009 | Thompson et al. |
| 2009/0267832 A1 | 10/2009 | Hymel |
| 2009/0289844 A1 | 11/2009 | Palsgrove et al. |
| 2009/0292426 A1 | 11/2009 | Nelson et al. |
| 2009/0325594 A1 | 12/2009 | Lan et al. |
| 2010/0033339 A1 | 2/2010 | Gurley et al. |
| 2010/0139576 A1 | 6/2010 | Kim et al. |
| 2011/0148634 A1 | 6/2011 | Putz |
| 2011/0163873 A1 | 7/2011 | McIntosh |
| 2011/0172916 A1 | 7/2011 | Pakzad et al. |
| 2011/0187537 A1 | 8/2011 | Touchton et al. |
| 2011/0193706 A1 | 8/2011 | Dickerson |
| 2011/0193717 A1 | 8/2011 | Troxler |
| 2011/0298615 A1 | 12/2011 | Rich et al. |
| 2012/0000431 A1 | 1/2012 | Khoshkish |
| 2012/0132151 A1 | 5/2012 | Touchton et al. |
| 2012/0154154 A1 | 6/2012 | Troxler |
| 2012/0220314 A1 | 8/2012 | Altman et al. |

(56) References Cited

U.S. PATENT DOCUMENTS

| | | |
|---|---|---|
| 2012/0312250 A1 | 12/2012 | Jesurum |
| 2013/0008391 A1 | 1/2013 | Berntsen |
| 2013/0127658 A1 | 5/2013 | McFarland et al. |
| 2013/0141237 A1 | 6/2013 | Goetzl et al. |
| 2013/0157628 A1 | 6/2013 | Kim et al. |
| 2013/0226511 A1 | 8/2013 | Troxler |
| 2013/0265165 A1 | 10/2013 | So |
| 2013/0307688 A1 | 11/2013 | Hoffman et al. |
| 2013/0324166 A1 | 12/2013 | Mian et al. |
| 2014/0020635 A1 | 1/2014 | Sayers et al. |
| 2014/0104063 A1 | 4/2014 | Troxler |
| 2014/0120943 A1 | 5/2014 | Shima |
| 2014/0230755 A1 | 8/2014 | Trenkle et al. |
| 2014/0232541 A1 | 8/2014 | Trenkle et al. |
| 2014/0251233 A1 | 9/2014 | Bianchi et al. |
| 2014/0290013 A1 | 10/2014 | Eidelman et al. |
| 2014/0302842 A1 | 10/2014 | Lloyd et al. |
| 2015/0016730 A1 | 1/2015 | Miller et al. |
| 2015/0020750 A1 | 1/2015 | Jesurum |
| 2015/0040839 A1 | 2/2015 | Goetzl et al. |
| 2015/0107531 A1 | 4/2015 | Golden |
| 2015/0121535 A1 | 4/2015 | Fiss |
| 2015/0177010 A1 | 6/2015 | Abramson et al. |
| 2015/0216142 A1 | 8/2015 | Landers et al. |
| 2016/0015004 A1 | 1/2016 | Bonge |
| 2016/0021849 A1 | 1/2016 | Loosveld |
| 2016/0022185 A1 | 1/2016 | Agarwal et al. |
| 2016/0026837 A1 | 1/2016 | Good et al. |
| 2016/0135431 A1 | 5/2016 | Sheldon et al. |
| 2016/0189507 A1 | 6/2016 | Rayner |
| 2016/0195602 A1 | 7/2016 | Meadow |
| 2016/0205898 A1 | 7/2016 | Perrine |
| 2016/0371984 A1 | 12/2016 | Macfarlane et al. |
| 2017/0099807 A1 | 4/2017 | Northrop et al. |
| 2017/0156294 A1 | 6/2017 | Landers et al. |
| 2017/0295143 A1 | 10/2017 | Bone et al. |
| 2017/0337826 A1 | 11/2017 | Moran et al. |
| 2017/0372580 A1 | 12/2017 | Vivathana |
| 2017/0372581 A1 | 12/2017 | Solinsky et al. |
| 2017/0374510 A1 | 12/2017 | Solinsky et al. |
| 2018/0055011 A1 | 3/2018 | Landers et al. |
| 2018/0184618 A1 | 7/2018 | Gotts |
| 2019/0021283 A1 | 1/2019 | Landers et al. |
| 2019/0113625 A1 | 4/2019 | Farmer et al. |
| 2019/0120929 A1 | 4/2019 | Meadow |
| 2019/0133084 A1 | 5/2019 | Landers et al. |
| 2019/0141951 A1 | 5/2019 | Coughlan |
| 2019/0141953 A1 | 5/2019 | Landers et al. |
| 2019/0281794 A1 | 9/2019 | Ehrman et al. |
| 2020/0093096 A1 | 4/2020 | Blizzard |
| 2020/0204951 A1* | 6/2020 | de Barros Chapiewski ............... G08B 21/24 |
| 2020/0351623 A1 | 11/2020 | Eisner |
| 2021/0045353 A1 | 2/2021 | Ehrman et al. |
| 2021/0080595 A1 | 3/2021 | Landers |
| 2021/0084480 A1 | 3/2021 | Maier et al. |
| 2021/0190503 A1 | 6/2021 | Landers |
| 2022/0066045 A1 | 3/2022 | Farmer et al. |
| 2024/0003690 A1 | 1/2024 | Landers |

FOREIGN PATENT DOCUMENTS

| | | |
|---|---|---|
| EP | 0236614 A2 | 9/1987 |
| EP | 0396070 A2 | 11/1990 |
| EP | 0699330 A1 | 3/1996 |
| EP | 1550096 A2 | 7/2005 |
| EP | 2160724 A1 | 3/2010 |
| WO | WO 9427268 A1 | 11/1994 |
| WO | WO 2004034351 A2 | 4/2004 |
| WO | WO 2004114238 A2 | 12/2004 |
| WO | WO 2005064358 A1 | 7/2005 |
| WO | WO 2008153998 A1 | 12/2008 |
| WO | WO 2014070924 A1 | 5/2014 |
| WO | WO 2015021116 A1 | 9/2015 |
| WO | WO 2015142962 A1 | 9/2015 |
| WO | WO 2019182919 A1 | 9/2019 |
| WO | WO 2020142089 A1 | 7/2020 |
| WO | WO 2020145941 A1 | 7/2020 |
| WO | WO 2021055883 A2 | 3/2021 |

OTHER PUBLICATIONS

"Global Pet Finder GPS Pet Tracker", http://www.amazon.com/Global-Pet-Finder-GPS-Tracker/, Nov. 19, 2013, 5 pages.

"Tagg—The Pet Tracker Master Kit, White by Snaptracs, Inc.", http://www.amazon.com/TAGG-The-Pet-Tracker-Guard/, Nov. 19, 2013, 5 pages.

"Boundary Plus", http://www.invisiblefence.com/find-the-right-solution/, Jan. 29, 2013, 3 pages.

"Lookup_table", http://www.Wikipedia.org/wiki/Lookup_table, Feb. 15, 2013, 10 pages.

"SkyFence: Our_Product", http://www.gpspetfence.homestead.com/resources.html, Jan. 29, 2013, 3 pages.

"SkyFence: Purchase", http://www.gpspetfence.homestead.com/Purchase.html, Jan. 29, 2013, 2 pages.

"Tagg: About US", http://www.pettracker.com/about-tagg, Jan. 29, 2013, 1 page.

"Kalman Filter", Wikipedia, https://en.wikipedia.org/wiki/Kalman_filter, Jan. 18, 2016, 37 pages.

Skinner, B. F., "Superstition in the Pigeon", Journal of Experimental Psychology, vol. 38, pp. 168-172, 1948.

\* cited by examiner

GRAPHICAL SHEPHERDING

BACKGROUND OF THE INVENTION

1. Field of the Invention

This invention pertains generally to electrical communications, and more particularly to condition responsive indicating systems with a radio link and including a personal portable device for tracking location. The condition responsive indicating systems of the present invention monitor the specific condition of humans or animals. In one preferred manifestation, a fully self-contained collar designed in accord with the teachings of the present invention monitors the location of a pet such as a dog, and provides a plurality of zones within which well defined and positive stimulus are provided to train the pet to stay within a predetermined area, and to shepherd a wayward pet back to the predetermined area even when the predetermined area has an unusual geometry.

2. Description of the Related Art

Dogs are well known as "man's best friend" owing to the many beneficial services that they provide. However, and likely since mankind first befriended dogs, there has existed a need to control the territory that a dog has access to. There are many reasons that motivate this need, many which may be relatively unique to a particular dog or owner, and other reasons that are far more universal.

Irrespective of the reason, there have been limited ways to communicate to a dog a territory that the dog should stay within, and to elicit this behavior from a dog. One method is a fixed containment structure such as a fence or building. A structure of this nature provides a physical boundary or barrier which blocks passage of an animal such as a pet or farm animal. As may be apparent, such structures are typically expensive and time consuming to install, and necessarily static in location. In other words, they are only useful at the location where they are constructed, and so are of no value when a pet and owner travel. Furthermore, these static structures often interfere in other ways with other activities of the dog owner, such as with lawn care or interfering with the owner's movement about a property. In addition, a dog may find ways to bypass the structure, such as by digging under a fence or slipping through a not-quite completely secured gate.

A second approach to controlling accessible territory is through a combination collar and leash or similar restraint. The leash is anchored to a fixed point, or in the best of situations, to a line or cable along which the dog can travel. Unfortunately, most dogs are notoriously bad at untangling or unwrapping a leash from a fixed object. Consequently, dogs tend to tangle the leash about trees, posts and other objects, and can become completely unable to move. If the owner is not aware that the dog has become tangled, this can lead to dangerous situations in cases such as extreme weather or when the dog has been left unattended for an extended period.

Additionally, some dogs are very good at escaping the leash, such as by backing away from the leash and using the leash force to slip off the collar, or by chewing through the leash. Once again, if the owner is unaware, the dog may travel from the desired area into other unsuitable areas such as roadways and the like. This may put both dog and humans in jeopardy, such as when a vehicle swerves to avoid the dog or when a dog has a temperament not suited to the general human population.

The leash also necessarily defines the region in which the dog may travel. For exemplary purposes, with a ground stake and a leash the dog is constrained to a circle. In this example, the owner will typically define the circle to the smallest radius that the dog may desirably travel within. As can be understood, for all but circularly shaped areas, this leads to a great deal of space that the dog cannot access, but which would otherwise be suitable for the dog.

In consideration of the limitations of static structures and leashes, various artisans have proposed other systems that provide more flexibility and capability, such as buried or above ground transmitter antennas and radio collars that either detect the crossing of a buried line or detect the reception or absence of reception of a signal broadcast by the transmitter antenna. When an undesirable location is detected, the radio collar is then triggered, typically to provide a painful electrical stimulation to the dog. Desirably, the electrical stimulation is mild enough not to harm the dog, but yet still strong enough to cause the dog to want to avoid additional similar stimulation. These systems remove the physical link between a dog and a static structure, meaning the dog will not get tangled in obstacles when moving about. Further, in the case of a buried line, the line may follow any geometry of land, and so is not limited to a circular pattern limited by a particular radius.

Unfortunately, burying a line can be difficult or impossible if there are other objects, such as irrigation systems, buried utility lines, landscaping, hard surfaces, trees, or other fixed objects. Additionally, current soil conditions such as frozen soil or snow-covered ground in the winter may also limit the ability to bury the line. Furthermore, the effort required to bury the line limits these systems to a single location, meaning the system cannot readily be moved or transposed from the home to a popular park or the like.

Radio systems that rely upon the detection of a signal to generate a shock, such as the buried line, are also well known to be significantly affected by static and other forms of Electro-Magnetic Interference or Radio-Frequency Interference (EMI-RFI). Consequently, a dog may be shocked or otherwise punished without basis or appropriate reason. This problem is also very location dependent, meaning that there are places where there is so much EMI-RFI that a radio system is completely unusable. As a result of the inability to completely eliminate or substantially eradicate the effects of EMI-RFI, the use of these radio systems is far from universal.

When the shock is instead triggered by the absence of a radio signal, such as when a beacon is used to contain a pet, obstacles such as buildings may prevent reception, undesirably limiting the range of travel of the animal. Furthermore, blocking the signal from the collar, such as when a dog lays down, is being caressed by the owner, or is oriented in the wrong direction, may also lead to radio signal attenuation and undesirable triggering of the shock.

As is known in the field of psychology, this random punishment that is commonplace in both types of radio systems can literally destroy the training of a dog, and may lead to erratic or wanton misbehavior. Instead, many dog owners continue to rely upon static structures or leashes to control the territory accessible by their dog.

Another problem arises when a dog unintentionally crosses a buried line. Since it is the crossing of the line that leads to the stimulation, even when the dog realizes and tries to return, the same stimulation originally keeping the dog in a containment area is now being used to keep the dog out of that containment area. Consequently, the dog will be extremely confused, and will commonly not return, even where the dog would have otherwise. As but one exemplary purpose, when a rabbit, squirrel, or other animate creature is being chased by the dog, the dog will typically be so intent on the pursuit as to completely lose track of the location of the buried line. The dog's speed may be so great that even the stimulation is very short as the dog crosses the buried line, in the heat of the chase. Furthermore, the dog's attention and focus are thoroughly directed at the pursuit of the animate creature, and even the most powerful stimulus may go unnoticed. However, once the chase is over, the dog's adrenaline or drive has diminished. A reasonably well-behaved dog will then most likely be moving more slowly back toward "home" within the containment area. Unfortunately then, the stimulation trying to re-enter will most frequently be of much longer duration, and much more recognized by the now not-distracted dog, than when the dog left the containment area. As can be appreciated, this is backwards of the intent of a training system.

With the advent and substantial advancement of Global Positioning Systems (GPS), presently primarily used for navigation, artisans have recognized the opportunity to incorporate GPS technology into pet containment. Several systems have been proposed in the literature for several decades, but these systems have not as yet become commercially viable.

One significant limitation of prior art GPS systems is the accuracy of the system. Accuracy can be dependent upon variables such as atmospheric variations, signal reflections and signal loss due to obstacles, and variability intentionally introduced into the system. Similar variability is found in various radio and cellular locating systems.

A GPS or similar navigation system that is accurate to plus or minus ten meters is very adequate for navigational purposes, for example to guide a person to a commercial building for a meeting or for other commerce. However, for pet containment this level of accuracy is completely unacceptable. For exemplary purposes, many residential yards are forty feet wide, or approximately 10 meters. A system that is only accurate to plus or minus ten meters might try to locate the dog in either neighbor's yard on any given day or at any given moment, depending upon unpredictable and uncontrollable variables such as atmospheric conditions. As will be readily appreciated, this unpredictable locating will lead to punishment of the animal when, in fact, the animal is within the proper location. In turn, this will lead to a complete failure of training, and erratic and unpredictable behavior of the animal.

Another limitation is the amount of calculation required to determine whether the pet is within a selected area of containment. Most prior art GPS systems use nodes to define the perimeter, and then mathematically calculate where the pet is relative to the nodes. Unfortunately, this requires a substantial amount of computation, which increases greatly as the number of nodes are increased. As a result, these systems commonly rely upon a primary processing system that is remote from the dog, to which the dog's collar is coupled via radio waves or the like. This permits the primary processing system to perform calculations and then relay results or control signals back to the collar. Undesirably, this also adds complexity, drains precious battery power limiting the usable collar time, and again makes the containment system dependent upon conventional radio communications systems. In addition, the need for both the collar and a secondary base station makes the system far less portable. This means, for example, that taking the dog away from home to a park may be impractical.

A further limitation of the prior art is battery life. A collar that must be removed and recharged every few hours is unacceptable for most purposes. Unfortunately, the intensive computations required by prior art systems require either a fast and consequently higher power processor unit, or a communications link such as a radio link to a base station. While the collar unit may transmit data back to the base unit to avoid the need for complex computational ability, even the transmission of position information and reception of collar actions requires a reasonably powered radio. It will be apparent that walkie-talkies, cell phones and other hand-held radio devices all have very large batteries to provide adequate transmission and reception life, and yet these devices often only support several hours of communications. As can be appreciated, size and weight are severely restricted for a device fully self-contained on a dog's collar, and the inclusion of a large battery is undesirable.

Yet another limitation of the prior art is the unintentional blocking or loss of GPS signals. There are a number of conditions that can lead to loss of GPS signals. One is unfavorable weather, which can lead to a severely attenuated satellite signal, and much higher Signal to Noise Ratios (SNR). Another condition is an adjacent building, canyon wall, or other obstacle that blocks satellite signals. Such a signal might, for exemplary purposes, either block all signals such as commonly occurs within a building, or instead may only block signals from one direction. However, GPS systems require multiple satellites to obtain a position fix, and even if only one of the satellites is blocked, then the ability to accurately fix position may be lost. Another situation that can lead to signal loss is when the collar itself is covered. This can, for exemplary and non-limiting purposes, occur when a dog lays down. If the dog lays in an unfortunate position partially or completely covering the collar, then satellite signals will be either blocked or too severely attenuated.

In any of these situations where the GPS signal is partially or completely blocked or attenuated, the latitudinal and longitudinal positional accuracy will either be inadequate, or may be completely lost. In such instances, a prior art collar may become completely non-functional. Worse, this loss of function can occur without notice in an erratic manner, possibly causing severe harm to the training of the dog.

In addition to the aforementioned limitations, prior art electronic fences have also attempted to train the animal using punishment, such as a shock, to elicit the desired behavior. As is very well known and established, negative reinforcement is less effective than positive reinforcement or a combination of positive and negative reinforcement. Furthermore, the type of reinforcement can also affect the temperament of the animal. This need for aversive treatment is, at least in part, believed to be due to the equally harsh construction of a boundary. The prior art structural fence evolved into an electronic fence that provided a harsh and distinct border which the animal was never supposed to cross. However, the natural instincts of many animals are to wander and explore. This harsh border provides little or no warning to an exploring animal, and, as noted herein above, this border may even move with respect to a fixed land location. The combination can literally destroy the psychological well-being of the animal. Consequently, it is desirable to not only provide consistent behavioral reinforcement, but also to provide that reinforcement in a positive manner.

The following patents and published patent applications are believed to be exemplary of the most relevant prior art, and the teachings and contents of each are incorporated herein by reference: U.S. Pat. No. 4,393,448 by Dunn et al, entitled "Navigational plotting system"; U.S. Pat. No. 4,590,569 by Rogoff et al, entitled "Navigation system including an integrated electronic chart display"; U.S. Pat. No. 4,611,209 by Lemelson et al, entitled "Navigation warning system and method"; U.S. Pat. No. 4,817,000 by Eberhardt, entitled "Automatic guided vehicle system"; U.S. Pat. No. 4,967,696 by Tobias, entitled "Dog collar"; U.S. Pat. No. 4,999,782 by BeVan, entitled "Fixed curved path waypoint transition for aircraft"; U.S. Pat. No. 5,067,441 by Weinstein, entitled "Electronic assembly for restricting animals to defined areas"; U.S. Pat. No. 5,191,341 by Gouard et al, entitled "System for sea navigation or traffic control/assistance"; U.S. Pat. No. 5,351,653 by Marischen et al, entitled "Animal training method using positive and negative audio stimuli"; U.S. Pat. No. 5,353,744 by Custer, entitled "Animal control apparatus"; U.S. Pat. No. 5,355,511 by Hatano et al, entitled "Position monitoring for communicable and uncommunicable mobile stations"; U.S. Pat. No. 5,381,129 by Boardman, entitled "Wireless pet containment system"; U.S. Pat. No. 5,389,934 by Kass, entitled "Portable locating system"; U.S. Pat. No. 5,408,956 by Quigley, entitled "Method and apparatus for controlling animals with electronic fencing"; U.S. Pat. No. 5,450,329 byTanner, entitled "Vehicle location method and system"; U.S. Pat. No. 5,568,119 by Schipper et al, entitled "Arrestee monitoring with variable site boundaries"; U.S. Pat. No. 5,587,904 by Ben-Yair et al, entitled "Air combat monitoring system and methods and apparatus useful therefor"; U.S. Pat. No. 5,594,425 by Ladner et al, entitled "Locator device"; U.S. Pat. No. 5,751,612 by Donovan et al, entitled "System and method for accurate and efficient geodetic database retrieval"; U.S. Pat. No. 5,791,294 by Manning, entitled "Position and physiological data monitoring and control system for animal herding"; U.S. Pat. No. 5,857,433 by Files, entitled "Animal training and tracking device having global positioning satellite unit"; U.S. Pat. No. 5,868,100 by Marsh, entitled "Fenceless animal control system using GPS location information"; U.S. Pat. No. 5,911,199 by Farkas et al, entitled "Pressure sensitive animal training device"; U.S. Pat. No. 5,949,350 by Girard et al, entitled "Location method and apparatus"; U.S. Pat. No. 6,043,748 by Touchton et al, entitled "Satellite relay collar and programmable electronic boundary system for the containment of animals"; U.S. Pat. No. 6,114,957 by Westrick et al, entitled "Pet locator system"; U.S. Pat. No. 6,172,640 by Durst et al, entitled "Pet locator"; U.S. Pat. No. 6,232,880 by Anderson et al, entitled "Animal control system using global positioning and instrumental animal conditioning"; U.S. Pat. No. 6,232,916 by Grillo et al, entitled "GPS restraint system and method for confining a subject within a defined area"; U.S. Pat. No. 6,236,358 by Durst et al, entitled "Mobile object locator"; U.S. Pat. No. 6,263,836 by Hollis, entitled "Dog behavior monitoring and training apparatus"; U.S. Pat. No. 6,271,757 by Touchton et al, entitled "Satellite animal containment system with programmable Boundaries"; U.S. Pat. No. 6,313,791 by Klanke, entitled "Automotive GPS control system"; U.S. Pat. No. 6,421,001 by Durst et al, entitled "Object locator"; U.S. Pat. No. 6,441,778 by Durst et al, entitled "Pet locator"; U.S. Pat. No. 6,480,147 by Durst et al, entitled "Portable position determining device"; U.S. Pat. No. 6,487,992 by Hollis, entitled "Dog behavior monitoring and training apparatus"; U.S. Pat. No. 6,518,919 by Durst et al, entitled "Mobile object locator"; U.S. Pat. No. 6,561,137 by Oakman, entitled "Portable electronic multi-sensory animal containment and tracking device"; U.S. Pat. No. 6,581,546 by Dalland et al, entitled "Animal containment system having a dynamically changing perimeter"; U.S. Pat. No. 6,700,492 by Touchton et al, entitled "Satellite animal containment system with programmable boundaries"; U.S. Pat. No. 6,748,902 by Boesch et al, entitled "System and method for training of animals"; U.S. Pat. No. 6,903,682 by Maddox, entitled "DGPS animal containment system"; U.S. Pat. No. 6,923,146 by Kobitz et al, entitled "Method and apparatus for training and for constraining a subject to a specific area"; U.S. Pat. No. 7,034,695 by Troxler, entitled "Large area position/proximity correction device with alarms using (D) GPS technology"; U.S. Pat. No. 7,259,718 by Patterson et al, entitled "Apparatus and method for keeping pets in a defined boundary having exclusion areas"; U.S. Pat. No. 7,328,671 by Kates, entitled "System and method for computer-controlled animal toy"; U.S. Pat. No. 7,677,204 by James, entitled "Dog training device"; U.S. Pat. No. 7,856,947 by Giunta, entitled "Wireless fencing system"; U.S. Pat. No. 8,155,871 by Lohi et al, entitled "Method, device, device arrangement and computer program for tracking a moving object"; U.S. Pat. No. 8,115,942 by Thompson et al, entitled "Traveling invisible electronic containment perimeter—method and apparatus"; U.S. Pat. No. 8,624,723 by Troxler, entitled "Position and proximity detection systems and methods"; U.S. Pat. No. 8,757,098 by So et al, entitled "Remote animal training system using voltage-to-frequency conversion"; U.S. Pat. No. 8,797,141 by Best et al, entitled "Reverse RFID location system"; U.S. Pat. No. 8,839,744 by Bianchi et al, entitled "Mobile telephone dog training tool and method"; U.S. Pat. No. 8,851,019 by Jesurum, entitled "Pet restraint system"; 2007/0,204,804 by Swanson et al, entitled "GPS pet containment system and method"; 2008/0,252,527 by Garcia, entitled "Method and apparatus for acquiring local position and overlaying information"; 2011/0193706 by Dickerson, entitled "Sensor collar system"; 2012/0000431 by Khoshkish, entitled "Electronic pet containment system"; 2013/0127658 by McFarland et al, entitled "Method and apparatus to determine actionable position and speed in GNSS applications"; 2013/0157628 by Kim et al, entitled "Smart phone based electronic fence system"; and EP 0699330 and WO 94/27268 by Taylor, entitled "GPS Explorer".

In addition to the aforementioned patents, the present applicant also has developed a number of techniques that are related to the present invention that are represented in the following granted patents and published applications, the teachings of each which are incorporated herein by reference: 9,795,118; 9,961,884; 10,064,390; 10,080,346; 10,165,755; 10,165,756; 10,172,325; 10,251,371; 10,292,365; 10,342,218; 10,405,520; 10,455,810; 10,470,437; 10,624,319; 10,820,575; 10,893,662; 11,019,807; 11,246,291; 2021/0080595; and 2021/0190503.

In addition to the foregoing, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a wireless location assisted zone guidance system configured to assist in the training and management of an animal and providing an extended area of behavioral guidance. The system includes a housing and an electrical power source contained within the housing. At least one animal stimulation apparatus is electrically coupled with the housing and powered by the electrical power source. A wireless location determination apparatus is contained within the housing, powered by the electrical power source, and configured to operatively generate current position information representative of a current position of the housing. An electrical processor is coupled to the wireless location determination apparatus and is operative to receive current position identifying information therefrom. Memory is included that is electrically accessible by the processor. A data table is stored in the electrically accessible memory. A plurality of guidance zone values are stored in the data table, with each guidance zone value stored in the data table identifying a one of a safe zone associated with a first behavioral guidance stimulation, an alert zone circumscribing the safe zone associated with a second behavioral guidance stimulation different from the first behavioral guidance stimulation, and an out-of-bounds zone circumscribing the alert zone associated with a third behavioral guidance stimulation different from the first and second behavioral guidance stimulations. The electrical processor is configured to operatively compare received current position identifying information to the data table to generate a first represented current position within the data table and to generate a second represented current position that is subsequent to the first represented current position. The electrical processor is further configured to vary an output of the at least one animal stimulation apparatus responsive to the second represented current position relative to the first represented current position, and further configured to determine when the housing is outside of said safe zone and said alert zone, and to control an output of the at least one animal stimulation apparatus to provide positive stimulus when the housing is determined to be outside of the alert zone and the second represented current position relative to the first represented current position is indicative of movement from the out-of-bounds zone into the alert zone. The electrical processor is further configured to read a future position guidance zone value located in a path of sequential future position guidance zone values stored in the data table that are defined in direction by a displacement from the second represented current position relative to the first represented current position and defined in location sequentially extending away from both of the second represented position and the first represented current position. Subsequent to the read of the future position guidance zone value, the electrical processor is configured to compare the read future position guidance zone value with the guidance zone value representing the out-of-bounds zone. Responsive to the compare, if the read future position guidance zone value does not equal the guidance zone value representing the out-of-bounds zone, the processor is configured to determine that the second represented current position relative to the first represented current position is indicative of movement from the out-of-bounds zone into the alert zone.

In a second manifestation, the invention is a method of electronically retrieving behavioral modification actions associated with a current geographic location and movement direction including shepherding wayward dogs to selectively shepherd the wayward dog back into an alert zone. In accordance with the method, a behavioral guidance region that has a plurality of distinct behavioral guidance zones including a safe zone, the alert zone, and an out-of-bounds zone is electronically stored in an electronically accessible memory as a two-dimensional data table having a first dimension index and a second dimension index. A unique set of behavioral modification actions associated with each one of the plurality of distinct behavioral guidance zones is electronically saved in the electronically accessible memory. A current geographic location relative to the behavioral guidance region is electronically determined. A direction of at least one of a movement from a first represented position in the data table to a second represented position in the data table and a movement intent from the first represented position relative to the alert zone is electronically detected. Positive stimulus is produced within the at least one animal stimulation apparatus when the current geographic location is determined to be within the out-of-bounds zone and the second represented current position relative to the first represented current position is indicative of movement from the out-of-bounds zone into said alert zone. The step of electronically detecting a direction of at least one of a movement and a movement intent relative to the alert zone further comprises the steps of electronically reading a future position guidance zone value located in a path of sequential future position guidance zone values stored in the data table that are defined in direction by a displacement from the second represented current position relative to the first represented current position and defined in location sequentially extending away from both of the second represented position and the first represented current position; electronically comparing the read future position guidance zone value with the guidance zone value representing the out-of-bounds zone subsequent to the read of the future position guidance zone value; and electronically determining responsive to the compare that if the read future position guidance zone value does not equal the guidance zone value representing the out-of-bounds zone that the second represented current position relative to the first represented current position is indicative of movement from the out-of-bounds zone into the alert zone.

In a third manifestation, the invention is a method of electronically retrieving behavioral modification actions associated with a current geographic location and movement direction including shepherding wayward dogs to selectively shepherd the wayward dog back into an alert zone. In accordance with the method, a behavioral guidance region that has a plurality of distinct behavioral guidance zones including a safe zone, the alert zone, and an out-of-bounds zone is electronically stored in an electronically accessible memory as a two-dimensional data table having a first dimension index and a second dimension index. A unique set of behavioral modification actions associated with each one of the plurality of distinct behavioral guidance zones is electronically saved in the electronically accessible memory. A current geographic location relative to the behavioral guidance region is electronically determined. A direction of at least one of a movement from a first represented position in the data table to a second represented position in the data table and a movement intent from the first represented position relative to the alert zone is electronically detected. Positive stimulus is produced within the at least one animal stimulation apparatus when the current geographic location is determined to be within the out-of-bounds zone and the second represented current position relative to the first represented current position is indicative of movement from the out-of-bounds zone into said alert zone. The step of electronically detecting a direction of at least one of a movement and a movement intent relative to the alert zone further comprises the steps of electronically first calculating said movement from the out-of-bounds zone into the alert zone using a first calculation technique; and electronically second calculating said movement from the out-of-bounds zone into the alert zone using a second calculation technique different from the first calculation technique.

OBJECTS OF THE INVENTION

Exemplary embodiments of the present invention solve inadequacies of the prior art by providing a wayward dog who has moved outside of an assisted guidance region various feedback specifically designed to shepherd the dog back into a safe zone. This is accomplished in the preferred embodiment by providing positive feedback when the dog is moving in a direction back towards the safe zone, by providing the safe zone stimulus or a similar stimulus such as a rewarding tone or a rewarding recorded voice. If instead the unit detects movement away from the safe zone, the unit will deliver a non-aversive second alert zone stimulus to the dog. If the collar unit detects movement that isn't getting closer or further away, it delivers a first alert zone vibration to the dog. In this manner, the dog is continually rewarded for movement towards the safe zone, and electrically alerted for other movement. The dog will thereby be directed back into the safe zone. As the dog is crossing back in to the assisted guidance region from out-of-bounds, the unit will preferably combine the comforting tone of the safe zone with a medium level vibration until the dog is in the safe zone.

The present invention and the preferred and alternative embodiments have been developed with a number of objectives in mind. While not all of these objectives are found in or required of every embodiment, these objectives nevertheless provide a sense of the general intent and the many possible benefits that are available from ones of the various embodiments of the present invention.

A first object of the invention is to provide a safe and humane apparatus for modifying the behavior of a pet. From the descriptions provided herein and the teachings incorporated by reference herein above, it will be apparent that the present invention may also be applied in certain instances to humans, livestock or other animals. A second object of the invention is to provide a fully self-contained apparatus that will determine location and provide stimuli based upon that location for extended periods of operation. As a corollary, the fully self-contained apparatus is preferably operational with universally available location systems, including but not limited to satellite GPS, cellular telephone triangulation systems, and radio triangulation system such as Loran, but may alternatively be provided with a custom location system if so desired. By using universally available location systems, there is no limit on the locations where the apparatus may be used. Another object of the present invention is to enable simple and efficient set-up and operation by a person. A further object of the invention is to efficiently and expeditiously train a pet, to significantly reduce training time and increase the effectiveness of the training. As a corollary, embodiments of the present invention will preferably provide the effective animal training while preserving the spirit and positive attitude of the animal. Yet another object of the present invention is to enable a person to set an acceptable area or "safe zone" using only the self-contained apparatus, and to adjust or redefine the area again by simple manipulation of the self-contained apparatus. An additional object of the invention is to enable the self-contained apparatus to automatically generate a number of zones that facilitate positive training and behavior modification, and thereby guide a pet or other living being appropriately. A further object of the invention is to shepherd a wayward dog who has moved outside of an assisted guidance region back in using non-aversive stimuli, even when the predetermined area has an unusual geometry. A further object of the invention is to incorporate a variety of stimuli that access the animal's neurological system through different pathways or channels to better gain the attention of the animal.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 5 illustrates the upper left tile or quadrant taken from the map of numerical values of FIG. 4.

DESCRIPTION OF THE PREFERRED EMBODIMENT

Figure 1:
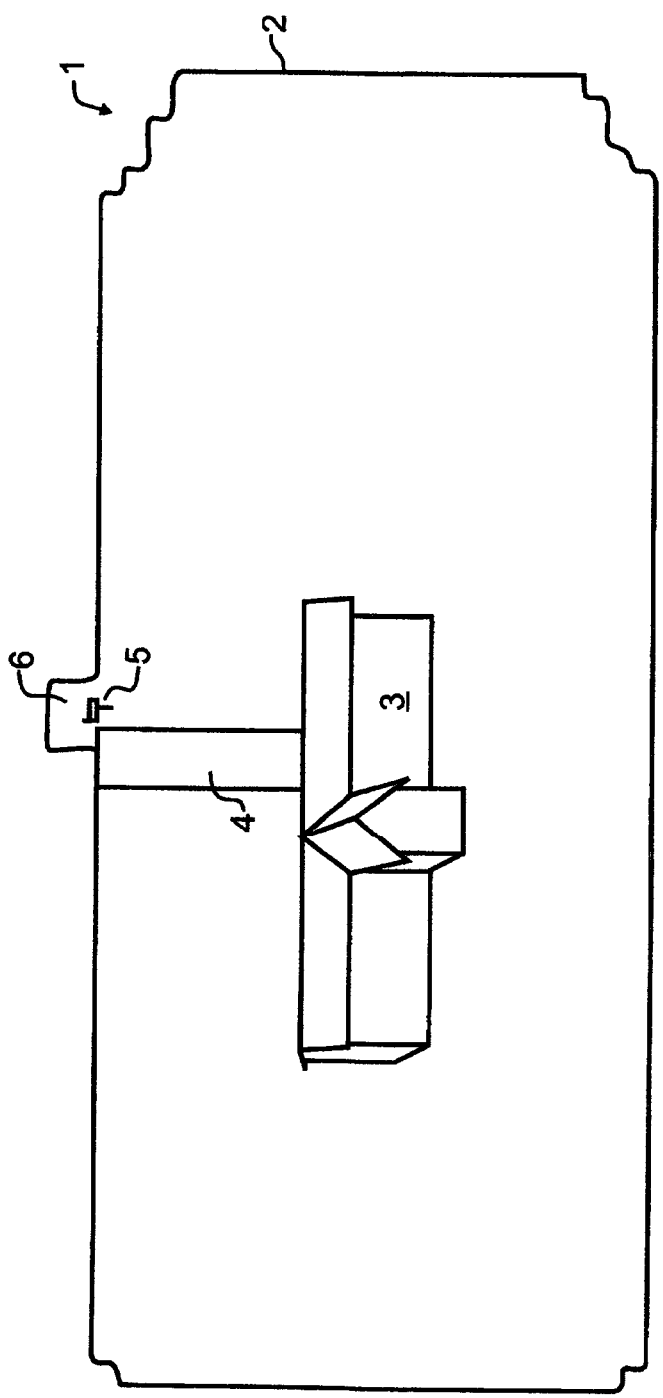
FIG. 1 illustrates a prior art property such as might be mapped in accord with the teachings of the present invention.

In a preferred embodiment designed in accord with the teachings of the present invention, a pet owner might want to train a pet to stay within an example property 1 such as that illustrated in prior art FIG. 1. An outer limit of the property 2 may encompass one or more buildings 3, a driveway 4, and a mailbox 5. If, for exemplary purposes, the pet is or will be trained to walk with the owner to the mailbox, or to retrieve the newspaper from adjacent to the mailbox, then the owner may wish to provide a small peninsula 6 which could extend beyond the bounds of the particular property location.

A self-contained collar apparatus, which might for exemplary purposes and not solely limiting thereto resemble that illustrated by Swanson et al in 2007/0204804 and incorporated by reference herein above, will preferably contain the necessary electronic components such as illustrated in the Swanson et al FIG. 5, including components to receive and decipher location determining signals and also preferably containing both volatile and non-volatile memory. In the preferred embodiment, the location determining signals are converted to latitude and longitude references, though any suitable coordinate reference representative of a geographic area may alternatively be used. Human interaction interfaces, such as switches and a display will also preferably be provided, again such as illustrated in the Swanson et al published patent application, to allow a person to interact with the collar apparatus. Other requisite components, both as described in Swanson et al and as will be understood from the following description, will also be provided therein.

To establish a new area, a person will interact with the self-contained collar apparatus switches or other suitable input apparatus to identify that a new assisted guidance region is to be recorded. Next, the person will transport the self-contained collar apparatus around the perimeter of the land area, such as by following outer limit 2. During this traverse of the outer limit 2, the self-contained collar apparatus will record discrete location points which have been traversed, and add those to a table stored in a memory within the collar. Once the outer limit 2 has been traversed, the person will again interact with the self-contained collar apparatus to identify that the outer limit has been traversed, or, if so enabled, the collar will automatically detect that an area has been completely circumscribed.

Figure 2:
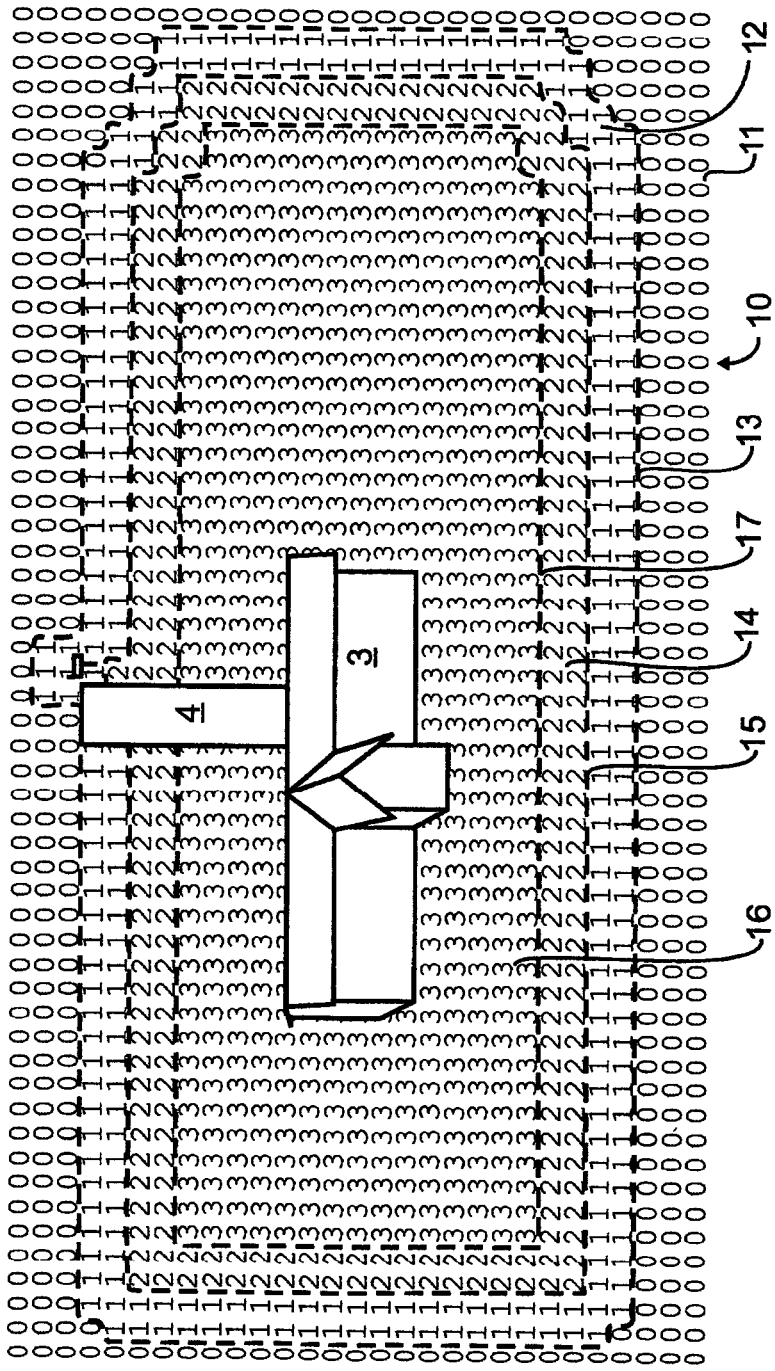
FIG. 2 illustrates a map of numerical values visually overlaid onto and electronically associated with the property of FIG. 1, in accord with the teachings of the present invention.

Next, the micro-controller or other suitable processor will preferably automatically convert this outer limit 2 into a table 10 of values such as illustrated for exemplary purposes in FIG. 2. The embodiments disclosed herein may be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices.

While the numerals 0-3 are used therein for the purposes of the present illustration, any suitable designations, whether numeric or not, may be used. As but one example, the numerals 0-3 represent four choices, and so may easily be represented by two bits of data. In such case, the possible combinations are binary 00, 01, 10, and 11. Furthermore, the present invention is not limited solely to four choices, and any number of choices, including both more and fewer than four, determined by a designer to be appropriate for the apparatus that is otherwise generally compliant with the remainder of the present description will be understood to be incorporated herein.

While FIGS. 1 and 2 illustrate an exemplary outline of an area that the pet owner might wish to contain a dog within, which is a subset of the total property, the area can be of any geometry, and in the example is somewhat irregular.

In the preferred embodiment, a number of different zones are defined based upon the traversal of outer limit 2 during initial setup. The area beyond outer limit 2 is defined by an "out-of-bounds" zone 11 represented by a numerical value of zero at each discrete location. Immediately inside of the zero-value locations is a zone of locations assigned a numerical value of one. This will be referred to herein as the "second alert zone" 12. Between "out-of-bounds" zone 11 and "second alert zone" 12 in FIG. 2, a dashed line 13 has been drawn for illustrative purposes. This line does not actually exist in the stored data table, but instead helps to better illustrate the various zones that are defined by the various location values.

A plurality of discrete locations relatively inward from the second alert zone 12 are assigned a numerical value of two, and represent a "first alert zone" 14. Again, for the purpose of illustration only, a dashed line 15 is shown separating first alert zone 14 from second alert zone 12. Again, and like line 13, this line 15 does not actually exist in the stored data table, and is provided solely for illustrative purposes.

Finally, an innermost "safe zone" 16 preferably intentionally encompasses the largest area of all zones and is populated with discrete location values assigned to equal the numerical value of three. Dashed line 17, like lines 13 and 15, indicates the separate zones, but does not exist in the stored data table.

As is evident when comparing FIGS. 1 and 2, line 13 corresponds approximately to outer limit 2. Due to the discrete nature of the resolution of the particular position determining system, such as a GPS system, the points defined during the traversal of outer limit 2 may or may not exactly correspond to the land location. In addition, since the outer limit 2 may not be linear, and may instead include a number of irregularities such as peninsula 21 and slightly cropped corners 23 and 26 referenced in FIG. 3, the data points more interior but generally adjacent to these irregularities will have variability in their associated geometries relative to that of the outer limit 2. So, and again for exemplary purposes, peninsula 21 is too narrow to provide for the as-illustrated exemplary two data point width provided for each zone. Nevertheless, there is a single data point of numerical value 2 protruding at reference numeral 22 illustrated in FIG. 3. Consequently, as outer limit 2 was traversed at set-up, a dog may reach the base of mailbox 5, which is located at this single data point of numerical value 2 at reference numeral 22, without receiving a second alert stimulus. Nevertheless, the dog will still receive a first alert stimulus such as a vibration. Similarly, the intricacies of notched corner 26 are lost as the corner becomes a simple square corner at reference numeral 27 of FIG. 3. Likewise, the elaborate stepping of cropped corner 23 fades some to simpler corner 24, and becomes a very simple single curve at more interior corner 25.

Also strictly for the purpose of illustration, and not limiting the invention solely thereto, two GPS location points are used as the width of each of the first alert and second alert zones. Consequently, in the embodiment as illustrated, each of these first alert and second alert zones are calculated to be approximately two GPS points in width. It will be understood herein that the width of the alert zones may be predetermined to be more or less than the exemplary and illustrated two data points. Furthermore, the number of alert zones may be varied from the two zones that are illustrated.

While the alert zone areas are, in fact, two data points wide, the width of the alert zones at sharp transition points, such as corners, may be greater or less than two data points in width. The particular decisions for how to shape interior zones will be determined by algorithms chosen or written by a designer at design time. Furthermore, there may be times where assisted guidance zones may take on a very irregular shape. This can occur, for exemplary purposes, when there is a narrow peninsula between two larger safe zones. When there is not sufficient room for the predetermined number of alert zone location points, such as within peninsula 21 of FIGS. 1 and 2, in the preferred embodiment the data point calculations still begin with the second alert zone value adjacent to the "out of bounds" area. This presents consistent operation near the borders, and provides more consistent training, which is considered herein to be very important to more quickly training an animal.

As may be apparent, a person may choose where to traverse in order to control the formation of various zones. As an example, a person trying to create a larger buffer adjacent a high traffic road would, when setting up the collar zones, simply walk an outer limit farther from the edge of the road. This maintains more consistent alert zone widths, which is believed to offer better training for an animal than varying the width of the alert zones. Nevertheless, and alternatively, it is contemplated herein to allow a person, the system, or the collar to vary the width of alert zones to correspond with various objects or hazards such as fences, gardens, and roadways.

Figure 3:
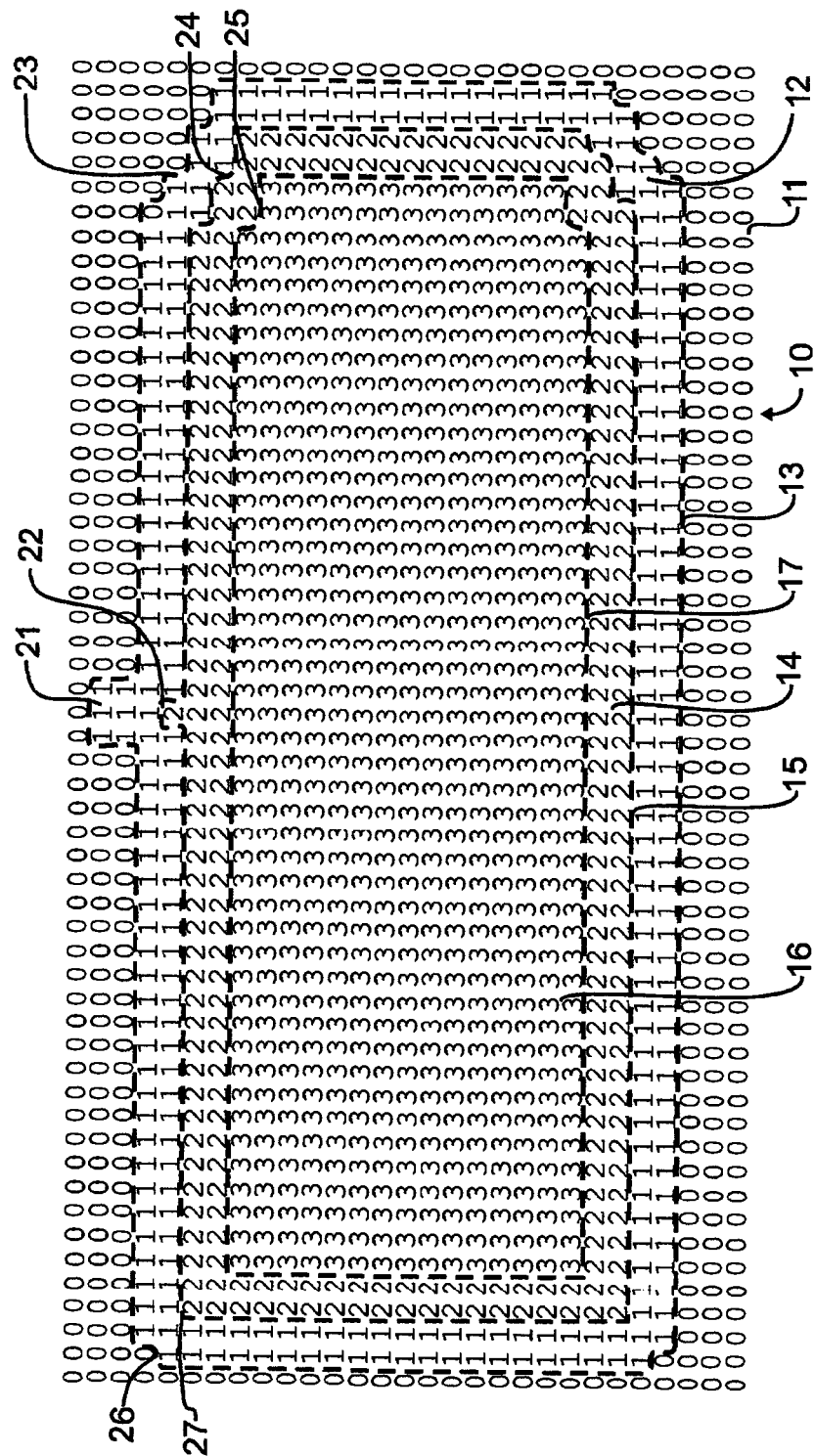
FIG. 3 illustrates the map of numerical values of FIG. 2, but absent the property illustrations.

FIG. 3 illustrates the data table 10 representation of the land area of FIG. 1, but without the land features shown. FIG. 3 simply shows the latitudinal and longitudinal plot of the shape of the assisted guidance zones, as defined by the numerical values stored in data table 10. In accord with the present invention, a latitude and longitude land map is converted to and saved as an X-Y plot or table of points, where one axis (in this case the rows) represents latitude and the other axis (in this case as illustrated, the columns) represents longitude. Each point is then assigned a numerical value that is representative of a zone within the assisted guidance region.

These points may for exemplary purposes and in accord with the preferred embodiment, correspond to specific points of geographic latitude and longitude determined to a particular degree of resolution. The degree of resolution may typically be the limit of precision available for a particular location system, such as six decimals of precision in a GPS system. So, as represented in FIG. 4, the latitude and longitude representations are presented to six decimal precision, though other suitable levels of precision are considered incorporated herein.

Noteworthy herein is the fact that the data points do not correspond to an exact measure in feet or inches. Instead, and as known in the industry of mapping, a single second of longitude at the equator is the equivalent of approximately 101 feet. In contrast, a single second of longitude at sixty degrees north latitude, which is approximately the location of Oslo, Norway; Helsinki, Finland; and Anchorage, Alaska; is only approximately 51 feet. Taken to the extreme, at the north and south poles, a second of longitude is zero feet. For prior art systems attempting to calculate distances in feet or inches, this deviation of longitudinal distance as the collar moves away from the equator drastically increases the complexity of calculations required. In contrast, the present invention directly associates GPS data points with zones, and disregards the distance in feet or inches that this may be equivalent to.

Figure 4:
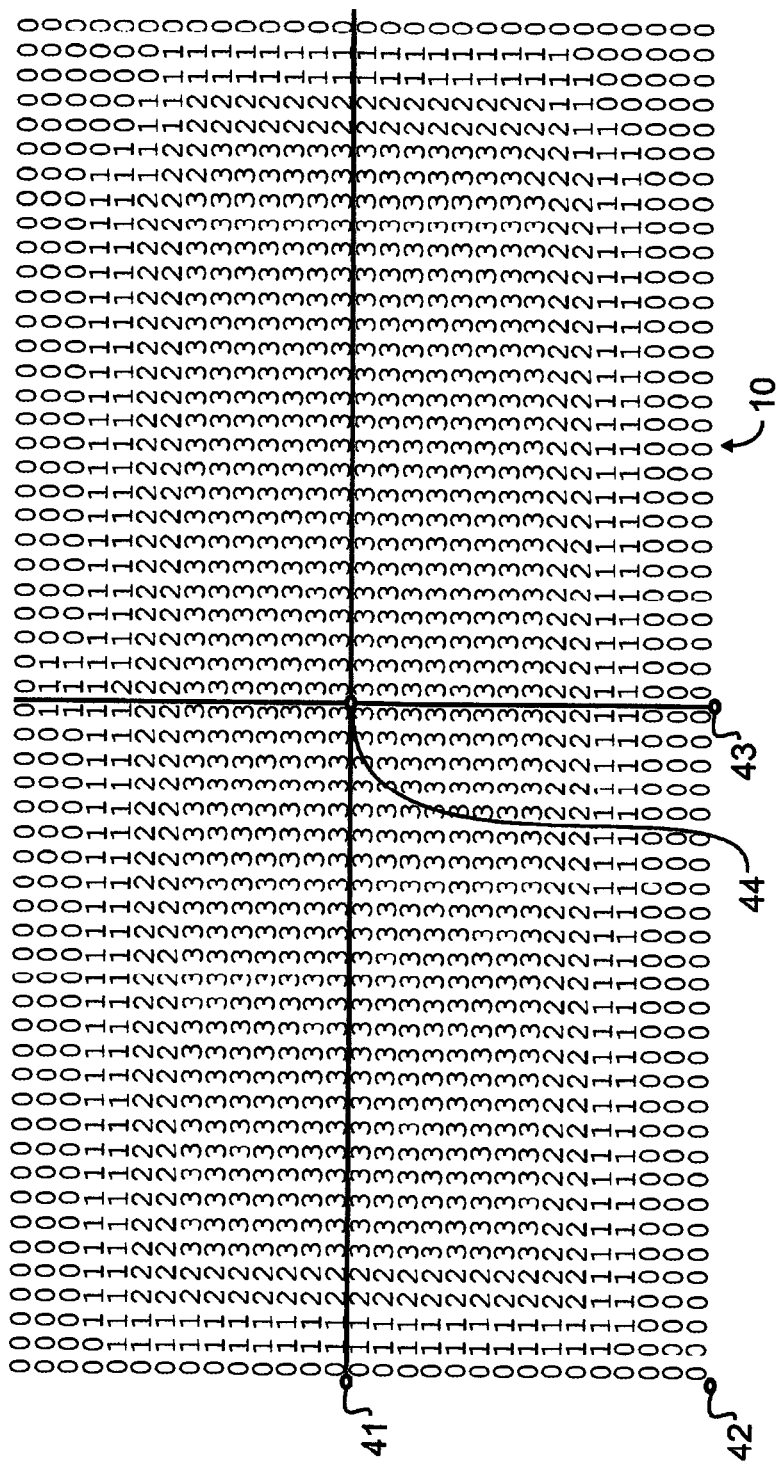
FIG. 4 illustrates the map of numerical values of FIG. 3, divided into four distinct tiles and including a latitude and longitude reference point associated with each tile.

In the illustration of FIG. 4, reference point 41 may for example represent a point at 44.925866 degrees latitude, and −92.940617 longitude. Reference point 42 may represent a point at 44.925673 degrees latitude, and −92.940617 longitude. Reference point 43 may be used to represent a point at 44.925673 degrees latitude, and −92.940160 longitude. Reference point 44 may be used to represent a point at 44.925866 degrees latitude, and −92.940160 longitude. While as illustrated these reference points 41-44 are shown slightly offset from and intermediate between the various data points, they may instead be selected to correspond exactly to a particular data point in table 10.

As may be appreciated, for a given amount of latitude and longitude resolution, the larger a tile is, the more memory is required to store the tile. In other words, if the GPS data point resolution were representative of five foot increments across the surface of the earth, it would only take twenty of these increments to cover a one hundred foot property boundary. For a square property of 100 feet by 100 feet, there would only be a total of 400 data points within the outer boundary. Even with the inclusion of data points outside of the boundary, this property could easily be mapped with a thousand data point tile.

In contrast, using this same five foot resolution, a large property such as a large ranch, farm, park, or the like would require more than one million points to map. As may be appreciated, this requires one thousand times the tile size to save the entire assisted guidance region within a single tile in memory, or one thousand times the available memory.

Storage of data table 10 requires memory, and a suitable electronic system within the collar will not be provided with unlimited memory within which to store data points. The particular type of memory selected is well within the level of skill of a designer of portable devices using microprocessors, micro-controllers and the like, and the invention is not limited to a single or particular type of memory. In accord with a preferred embodiment of the system, the memory will be divided into some combination of slower non-volatile memory and relatively faster but volatile RAM. The slower, non-volatile memory for exemplary but non-limiting purposes might comprise well-known flash memory. If the device uses higher speed memory such as RAM to reduce operation time, and there are more data points than available space in RAM to store table 10, the preferred embodiment processor will analyze the table and set up one or more tiles in RAM to be used during system operation.

To cover the exemplary property of FIG. 1, the numerical representation of FIG. 4 incorporates a total of four distinct "tiles" or squares that contain these numerical representations. FIG. 5 provides a zoomed-in view of only one of these four tiles, the top left tile of FIG. 4. Using this preferred numerical representation substantially reduces the calculations required when compared to the prior art.

In an exemplary operation, the latitude-longitude location of a dog is determined through the GPS system as is known in the field of navigation. This is then used to determine which tile, plurality of tiles, or single numerical representation is required to determine the position of the dog. If the tile containing the particular latitude and longitude is not already loaded into RAM, then it will be loaded. This determination will be easily made by comparing the current latitude and longitude to the reference points such as points 41-44 to select the appropriate tile(s). Then, preferably and for exemplary purposes, a simple RAM access may be made, where the RAM memory location is calculated based upon the present latitude and longitude offset from the lower-left latitude and longitude found on the numerical representation tile. This lower-left corner may be understood to be the reference location for the tile, such as reference point 41 in the illustration of FIG. 5. While any point within a tile may be used as a reference location, the lower-left is illustrated for exemplary purposes.

Figure 5:
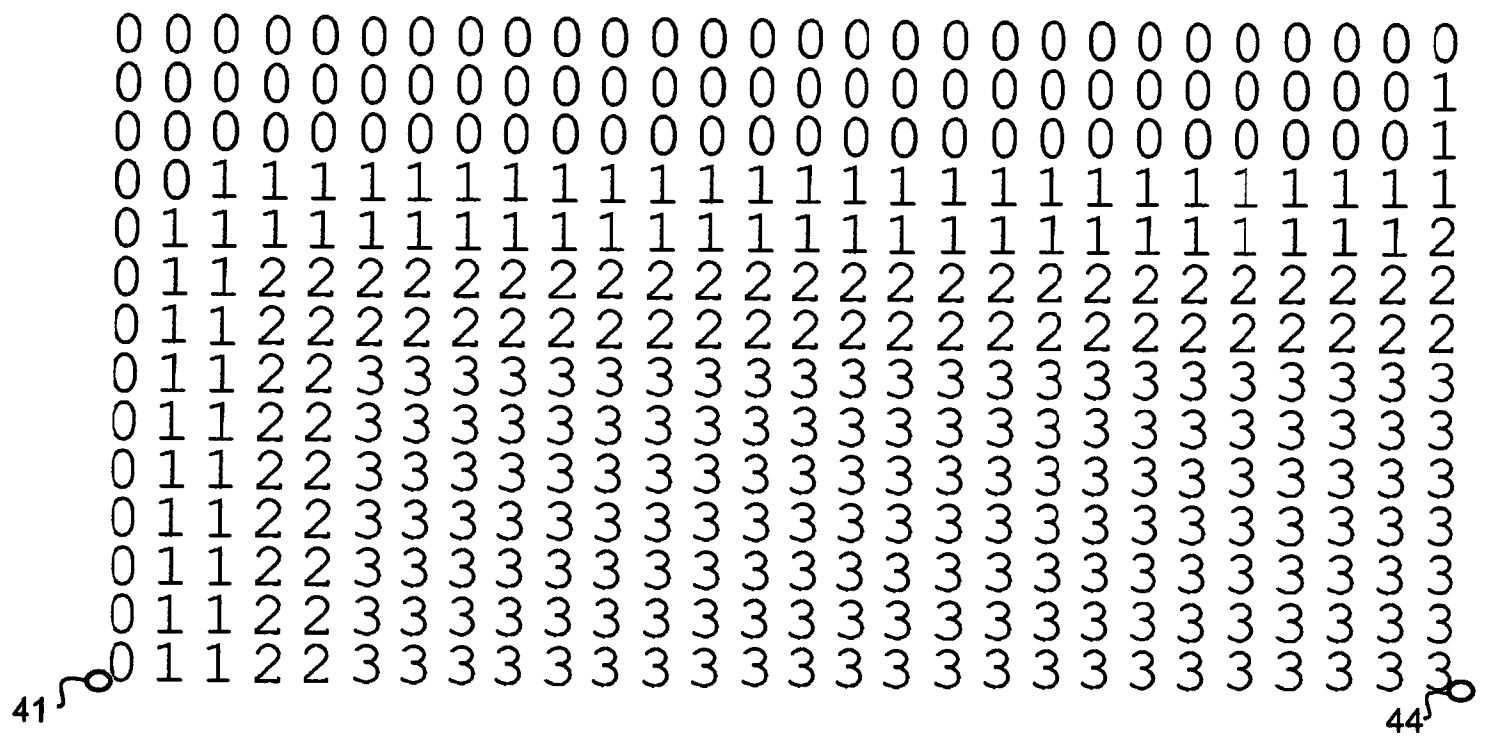

The offset determination is a simple subtraction of the reference location, such as reference point 41 of FIG. 5, from the currently determined location. Then, this difference is used as the table index, to directly address the particular table location. In the preferred embodiment, each data point is stored in memory using a double-indexed array, with each of the two indices of the array uniquely representing one of the latitudinal or longitudinal offset from the reference point. For exemplary purposes, this may be written as ArrayName [latitude-offset][longitude-offset]. Each unique [latitude-offset][longitude-offset] may for exemplary purposes point to a unique location in memory where the zone value associated with that geographic location is stored.

In an alternative embodiment, the offset may be additionally converted in a proportional or scalar calculation, where a particular number of degrees of latitude, for example, are known to equal one data point shift to the right in table 10. This requires storing the scalar conversion and an extra scalar calculation to look up the data value for a location, both which may be undesirable for some applications.

Once the offset is calculated, then the memory location is queried and the contents of the memory are returned in the form of a numerical value from 0-3, the meaning which represents whether the dog is comfortably within the safe zone ("3" in the preferred embodiment), or is in the first alert ("2" in the preferred embodiment), second alert ("1" in the preferred embodiment), or out-of-bounds zones. After GPS location is determined, the only calculation required during operation of the dog collar to determine whether the collar is within an assisted guidance zone is the calculation of offset in latitude and longitude from the reference point in the lower left corner of the tile. This is a very rapid and easy calculation, followed by a near-instantaneous read of the memory contents. In the preferred embodiment then, all numerical representation calculations are performed at the time the outer limit is defined, and then these numerical representation tiles are saved, preferably in non-volatile memory such as within EEPROM, flash memory, or equivalent storage. Saving in non-volatile memory allows the stored map to be used at a later date, even if the battery should fail in the interim.

The procedure used to clear a map from memory is also quite simple in the preferred embodiment. Once the user selects the map to delete, the associated tiles in memory are simply rewritten to numerical values of zero; or simply deleted from a directory of memory or a file allocation table; or otherwise deleted as known in the field of computing.

When the collar is in use for pet containment, the numerical representation tiles may be swapped into and out of active memory as required. This means that storage of diverse locations does not require storage of every location in between. So, for example, storage of two distinct one acre maps on opposite sides of the earth does not require storing millions of acres of maps. Instead, only those tiles associated with a latitude and longitude actually used by a map are required to be stored in memory. Again, while the use of tiles is not essential to the operation of the present invention, the ability to create these tiles means that with only very modest amounts of memory and processing capability, the present invention may be used to map one or a plurality of assisted guidance regions literally anywhere on earth.

A number of other features may also desirably or optionally be incorporated into a preferred embodiment pet assisted guidance system. Using the teachings of the present invention, the collar may be designed to contain an entire and independent pet assisted guidance system. In other words, no additional components would need to be purchased or acquired, nor is there a need for any other external device other than the GPS satellites. The collar will preferably interact directly with GPS signals received from GPS satellites, and may for enablement use a commercially available set of components to determine latitude and longitude.

Desirably, the accuracy of the GPS determinations may be significantly improved by incorporating a loosely coupled inertial navigation system into the collar. The inertial navigation system may then be used to validate GPS readings, and may also be used to discard outlier position info such as might be produced sporadically. For exemplary purposes, when an inertial system indicates no movement of the dog and a GPS or equivalent determination indicates a sudden multi-meter jump, then the data point indicative of a sudden multi-meter jump can be discarded or ignored. Likewise, tracking movement of the collar in combination with a compass within the collar may be used to determine what direction of travel is in a forward direction. Dogs do not run backwards. Consequently, if the GPS determination indicates a sudden reversal of direction without an associated reversal of direction by the compass, then this may also be discarded or ignored.

An inertial system or biometric system may also optionally be used to pre-alert dog state and predict sudden location changes. This can be used to be more pre-emptive at alerting the dog of impending boundaries. Exemplary biometric indicators might be heart or respiration rates, and an exemplary inertial indicator might be a sudden head lifting or movement.

Inertial, biometric and location-based indicators may further be used to control the frequency of GPS position calculation, which in turn is related to the average power consumption and battery life. So, for exemplary purposes, if the collar is in a dwelling, the GPS may be deactivated. Similarly, if inertial and/or biometric indicators suggest that the dog is sleeping, the sampling rate may be substantially less frequent, if at all, until the dog wakes up. Additionally, when the dog is within the safe zone, the sampling rate may also be less frequent.

When desired, a remote control interface or external device may also be provided, but such device is not mandatory. Where such an interface is provided, assisted guidance regions may also be communicated from an external computing device such as a cellular telephone or various other mobile or fixed computing devices. In such case, the collar unit will preferably be provided with a local wireless interface. The local wireless interface may be of any suitable type, including but not limited to Bluetooth™, cellular, or other type of radio or alternative communications link.

These assisted guidance regions may at least in some cases be calculated without requiring a person to first walk the perimeter. While not solely limited thereto, this can be particularly helpful at popular places such as at dog parks or other public places that might be frequented by many pet owners. In such case, a map already created for the park may be provided and may, for exemplary purposes, be downloaded from an Internet location through a smart phone, computer or other computing device. The map may be directly forwarded to the collar, or may be edited within the computing device and then forwarded. Additionally, with such an interface a user might draw an assisted guidance area perimeter or even various zones upon an electronically stored map and transmit them to the collar.

As aforementioned, there will preferably be multiple zones in the assisted guidance region such as the "safe", "first alert", and "second alert" zones to train and shape the behavior of an animal such as a pet, so that appropriate behavior may be rewarded, thereby improving training effectiveness and success. A very preferred aspect of the present invention is the careful rewarding of good behavior, and guiding the animal to the safe zone. This is most preferably accomplished in an entirely non-aversive manner. For exemplary purposes, a comforting stimulus may be provided at particular time intervals to assure or reassure a dog within the safe zone 16. Furthermore, such stimulus may be timed in accord with activity of the dog, such as when the dog is moving about and remaining within safe zone 16. For exemplary purposes and not solely limiting thereto, a comforting tone or recorded sound such as the owner's voice saying "good dog" may be periodically generated.

In one embodiment contemplated herein, the displacement of the dog will also be calculated, by using the difference of the current and previous positions represented in the data table over a time interval. In the event there is a danger of the dog moving outside of the safe zone, the first alert zone 14 stimulus may be applied, until the dog is confirmed to be remaining in safe zone 16, whereby the comforting stimulus may be applied.

The first alert zone 14 assigned with a numeric value of "2" may be used to generate a vibration which is preferably very distinct from the comforting tone or "good dog" recording of safe zone 16. This vibration will preferably gently alert the dog of the transition out of safe zone 16 and to the need to return thereto. Furthermore, this first alert zone vibration may be varied in both intensity and frequency when desired, for exemplary and non-limiting purposes such as to be further representative of such factors as proximity to adjacent zones, direction of travel, and speed of travel. The purpose of the first alert stimulation is not to invoke pain in any way, or to provide any punishment. Consequently, a gentle vibration or distinct tone is preferred. The purpose is simply to catch the attention of the dog and communicate to the dog that the dog has left the safe zone, so that the dog can elect to move back into the safe zone. This first alert is provided in real time, so that the dog will understand the purpose of the alert.

An important feature of the present invention is the detection of at least one indicator of the direction of travel of the dog, and whether that direction of travel is indicative of progress toward returning to the safe zone. For exemplary purposes only, and not solely limiting the present invention thereto, these indicators might include one or more of the following: sequential GPS position determinations indicating a shift of position toward the safe zone; a compass indication of a directional shift toward the safe zone; an inertial sensor detecting a direction change toward the safe zone; or other suitable indication of direction. In an alternative embodiment, the indicators might also include intent of direction by the animal, which may include a variety of indicators. For exemplary purposes only, intent might be an acceleration or velocity change indicative of a favorable slowing. When the dog is outside of the safe zone and the indicator of direction of travel indicates movement toward the safe zone, the safe zone stimulus will most preferably be provided. In the preferred embodiment, this may be a short sounding of the safe zone tone, for exemplary and non-limiting purpose, to reward the animal for moving toward the safe zone. Once back in the safe zone, the dog will again receive positive reinforcement from the safe zone stimulation as described above.

The second alert zone 12 assigned with a numeric value of "1" may be used to trigger a low level electrical impulse stimulation or other stimulation different from that of the safe zone and first alert zone stimulation. Once again, this stimulation will very preferably not generate pain, but instead will provide a distinct stimulation. Tactile stimulation is used in the preferred embodiment, with the desire to incorporate communications through a sensory pathway different from the auditory stimulation of the safe zone.

Noteworthy herein is that electrical impulse stimulation is well known in the medical, veterinary, and biological sciences, and can be varied for a particular intent. A weak stimulation may be unnoticeable. As the strength of stimulation is increased, there may be a gentle tingle. An even stronger stimulation can cause mild muscle contraction, and with enough strength, there can be a painful stimulation. For exemplary purpose, Transcutaneous Electrical Nerve Stimulation (TENS) is used in the treatment of humans explicitly as a technique to alleviate pain, rather than to cause pain, and electric current is likewise used in wound healing and tissue repair. Consequently, for the purposes of the present invention, this second alert zone stimulation will be understood to be detectable by the animal, while remaining below the threshold of pain.

The purpose of this second alert zone stimulation is, just as with the first alert zone stimulation, to gain attention of the dog, communicate the impending boundary, and to give the dog the opportunity to return to the safe zone. By making the stimulation different from the first alert zone, this second alert zone stimulation will also clearly provide proper notice to the dog of the impending boundary. This notice is provided in real time, so that the dog will understand the purpose of the notice.

Most preferably, if electrical impulse stimulation is used in the second alert zone, the stimulation will be provided using technology such as illustrated in U.S. Pat. No. 7,677,204 incorporated by reference herein above, which is considered to be a most humane method of application. Furthermore, this second alert zone electrical impulse stimulation may be varied in both intensity and frequency when desired, for exemplary and non-limiting purposes such as to be further representative of such factors as proximity to adjacent zones, direction of travel, and speed of travel. As with the first alert zone, in the second alert zone when an indicator of direction of travel indicates movement toward the safe zone, the safe zone stimulus will be provided.

Finally, a numeric value of "0" designates a point outside of the second alert zone. In this case, the dog may be stimulated with a stronger electrical impulse stimulation. Under ordinary circumstances, such as if the dog were at rest or idly roaming about, this level might be interpreted as representative of negative reinforcement or punishment. However, in the current invention this level of stimulation is expressly intended and designed not to cause pain, and instead will only be invoked when the animal's attention is so focused on some external interest that the animal fails to even notice the previous first and second alert stimuli. The sole purpose is to catch the attention of the animal. Consequently, the duration of this stimulation must also be very short. Any duration of the stimulation longer than required to gain the attention of the animal will be recognized to be quite aversive. For exemplary purposes only, and not solely limiting the present invention thereto, this might comprise four electrical impulses over a few second interval.

In accord with the teachings of the present invention, instead of continuing stronger stimulation indefinitely, which would then become aversive treatment, a wayward dog who has moved outside of the boundary and whose attention has not been garnered by the "out-of-bounds" stimulation will receive various feedback specifically designed to shepherd the dog back into the safe zone. In the foregoing description, time is described as one factor for calculating when to discontinue electrical impulse stimulation. Preferably, in addition to time, the direction of travel of the dog will also be considered. As soon as the dog starts moving toward the safe zone, electrical impulse stimulation will be discontinued irrespective of time outside of the safe zone. Instead, in the preferred embodiment positive feedback such as a safe zone or similar stimulus such as a rewarding tone or a rewarding recorded voice, without introducing aversive treatment. As may be apparent, in order to detect such motion using GPS determination, the dog must move sufficiently to traverse from one resolved GPS position to an adjacent resolved GPS position.

In an alternative embodiment of the invention, indicators of directional intent may be used in addition to actual detection of movement towards the safe zone. For exemplary and non-limiting purposes, these indicators of directional intent may include a compass indicating that the dog has turned or an inertial sensor indicating an acceleration toward the safe zone. Since dogs do not run backwards, a compass indicating that the dog has turned toward the safe zone signals intent. However, actual detected movement toward the safe zone is considered herein to be more positive than merely turning, and so in the preferred embodiment rewarding stimulus is reserved for such actual motion.

In another alternative embodiment, positive stimulus may be reserved for a combination of detected movement toward the safe zone and a secondary verification, such as an inertial sensor or compass substantiating the movement. As described herein above, this conformation provided by secondary detection substantially increases the certainty of GPS detected movement.

If instead the collar unit detects movement away from the safe zone, the collar unit will deliver a second alert zone stimulus to the dog. In the preferred embodiment, this second alert zone stimulus is a medium electrical impulse stimulation selected to provide tactile stimulation that does not invoke pain. If the collar unit detects movement that isn't getting closer or further away, it delivers the "first alert" vibration to the dog. In this manner, the dog is continually and immediately rewarded for movement toward the safe zone, is reminded through auditory stimulation for indeterminate movement, and receives tactile stimulation for movement away. The dog will thereby be directed back into the safe zone. As the dog is crossing back into the second alert zone from the "out of bounds" zone, the collar unit will preferably combine the comforting tone of the safe zone with a medium level vibration until the dog is in the safe zone. At that time, the collar unit will revert from this wayward dog shepherding mode back to the initial containment mode. This allows appropriate pet behavior to be rewarded, thereby improving training effectiveness and success.

Figure 6:
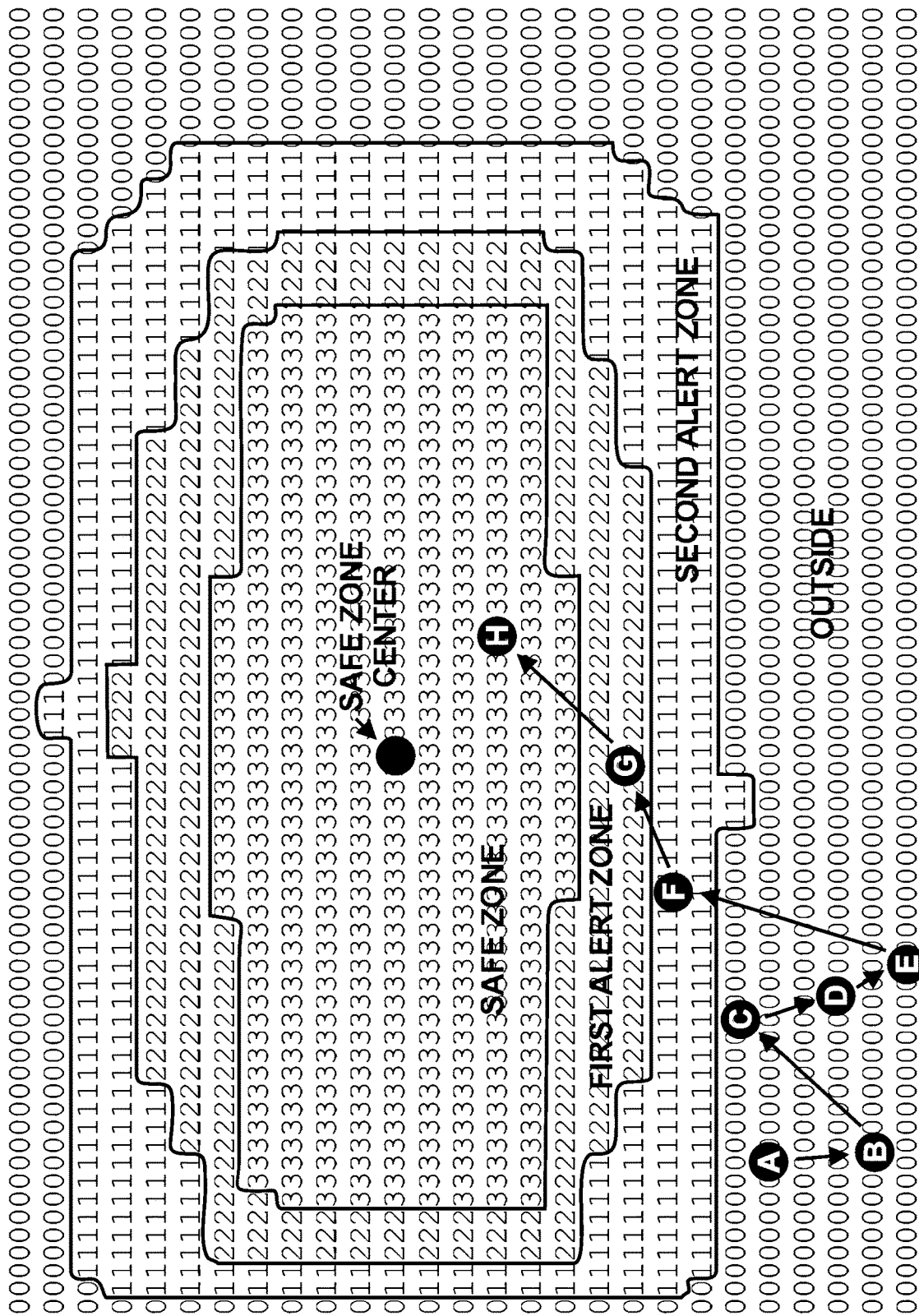
FIG. 6 illustrates a preferred embodiment wayward dog shepherding method designed in accord with the teachings of the present invention.

FIG. 6 illustrates this shepherding. A wayward dog who has been outside the second alert zone in the "out of bounds" zone for a sufficient period of time will switch from the collar unit delivering containment mode stronger electrical stimulation to the shepherding mode. This switch might, for exemplary purposes, occur when the dog is at position A of FIG. 6. If the dog then moves from position A to position B, which is away from the safe zone, the collar unit will deliver a second alert zone stimulus to the dog, which in the preferred embodiment is a medium electrical stimulation.

Determination of direction of travel has in the prior art involved distance-based calculations to the nearest border or zone, or the calculation of a velocity vector with direction. These calculations are inherently processor intensive, making them undesirably slow and resulting in undesirable battery drain. Instead, in accord with a preferred embodiment of the invention, the determination of direction of travel is intrinsically not a distance-based calculation. In other words, and again distinguishing the present invention from the prior art, the prior art converts to distance measurements, and then determines whether the dog is getting closer or farther away from the border.

In accord with the teachings of the present invention, in one alternative embodiment calculation of displacement from the safe zone can be made based upon the present location of the dog and the closest border point. With the preferred mapping of zone points, this can be a reasonably quick and efficient calculation, though it still requires scanning the table to find the nearest value in the data table with a "1" value representing the second alert zone. In the case of position A in FIG. 6, a scan of the data points immediately adjacent to position A shows all points have a value of "0". Scanning the next ring of data points, displaced from position A by one intervening datapoint, reveals a "1" in the vertical direction of FIG. 6. This simple scanning of "rings" of greater displacement from a current position provides the simple and relatively quick determination of the closest border.

Using this scanning of rings, and again for exemplary and non-limiting purpose, two alternative embodiments exist for determining whether position B is closer or farther from the border. In one embodiment, the same data point that provided the "1" value closest to position A may be checked with reference to position B. In the illustration of FIG. 6, this closest border point to point A is displaced from point B by five data points. As a result, the collar will readily determine that five data points displaced is more than the two data points of displacement from position A. In another alternative embodiment, a new scanning of rings may be conducted with respect to position B. A scan of position B requires five "rings" to identify the same "1" in the vertical direction of FIG. 6 that was identified by position A. Once again, five rings are greater than the second ring of position A, meaning the dog has moved farther from the alert zones.

This alternative embodiment calculation of distance to the nearest border is substantially more efficient than that of the prior art distance and velocity based calculations. However, such calculations have been inherently limited, based on the shape of the border. Animals, particular dogs, do not naturally interpret heading "home" as crossing a particular border at the nearest location. Instead, the natural behavior is to head towards a more interior location, such as the middle of a yard, toward a house or kennel, or a center of a property. Consequently, where an irregular border is present, in the prior art the dog may receive an adverse stimulus when the dog is, in fact, headed properly to a safe location such as the kennel. As may be apparent, this would lead to significant confusion and uncertainty, effectively undermining important training.

In contrast thereto, and in accord with a further preferred embodiment of the invention, determination of the direction of travel of the dog may be simplified even more by calculating an approximate center of the safe zone, preferably at the time the guidance zones are defined. This can range from a very complex analysis to a simple calculation of the center. For exemplary and non-limiting purposes, in one embodiment a simple calculation may be made by determining the mean value between extremes along the mapped X and Y axes of the safe zone, and designating this as the center of the safe zone from which the dog direction of travel is calculated. This is illustrated in FIG. 6 as the safe zone center. For the following discussion of FIG. 6, this method of determining whether the dog is moving back toward the safe zone is calculated using the illustrated safe zone center.

Nevertheless, other positions may be designated as the safe zone center. In one alternative embodiment, many dogs are taught that the command to kennel will require the dog to move to a safe place, the dog's kennel. In some instances then, the safe zone center may be manually set using the kennel, the house, a garage, or other location that the dog recognizes as a safe place as the safe zone center.

In accord with the present invention, the preferred embodiment uses the X and Y offsets in the data table between the collar and the safe zone center for calculations. In the preferred embodiment, the horizontal and vertical displacements are simply summed, and this sum is used to determine a reference displacement from the safe zone center. The resulting reference displacements may then be used to determine whether the dog is moving closer or farther from the safe zone center, as will be illustrated by example herein below. In an alternative embodiment, the method of calculating displacement uses the well known Pythagorean theorem, which enables a relatively precise calculation of this displacement. In accord with the theorem, this is achieved by summing the square of each of the horizontal and vertical displacements, and then calculating the square root of that sum. From the results, the preferred embodiment apparatus determines whether the displacement is increasing, decreasing, or staying the same.

Using either the sum of the horizontal and vertical displacements or the Pythagorean theorem, a small amount of "hysteresis" may be incorporated into the system. For exemplary and non-limiting purposes, using the Pythagorean theorem a deviation of plus or minus one-quarter data table offset might be considered to be neither towards or away from the safe zone.

Returning to FIG. 6 and the automatically calculated simple safe zone center, the displacement between the safe zone center and position A is eleven vertical GPS positions down and twenty-two horizontal positions to the left. Using the Pythagorean theorem to calculate displacement between safe zone center and position A, this would then be calculated as the square root of $(11^2+22^2)$, which calculates to 24.6 data points of displacement.

As can be appreciated, this calculation defined by the Pythagorean theorem is relatively precise and far simpler than converting GPS points to distances, but it still requires an unnecessary amount of calculation. Instead, and accord with the preferred embodiment using even more efficient processor calculations, and thereby consuming less energy from the collar battery, the processor will first determine each of the X and Y offset values for the current collar position relative to the safe zone center. Next, the processor will simply sum the absolute values of each to represent current displacement. This sum is used to determine a reference displacement from the safe zone center. Using the sum of horizontal and vertical displacements, position A is 33 reference points displaced from the safe zone center.

Continuing with FIG. 6, position B is an additional three points further vertically displaced, or a total of 36 reference points away. Consequently, with an extremely simple count of horizontal and vertical displacements within the data table from the safe zone center, position B can very quickly and efficiently be identified as being farther from the safe zone center than position A.

Recalling that this movement from position A to position B results in a second alert zone stimulus, this might, for exemplary purposes, cause the dog to change course and head toward the safe zone, to position C. Position C is eleven reference points closer to the safe zone center than position B. Detecting this movement from position B to position C, the collar unit will deliver the safe zone stimulus or a similar stimulus such as a rewarding tone or a rewarding recorded voice to the dog. At some point, the dog may wander off course, and move from position C to position D. Since this will quickly be calculated as one horizontal data point closer but three vertical points farther, or a net two reference points away from the safe zone, the collar unit will again deliver the second alert zone stimulus to the dog, which in the preferred embodiment is a medium electrical stimulation. This might, for exemplary purposes, again cause the dog to change course and head towards position E. Continuing to use the simple reference point summation, this direction from position D to position E of two vertical farther and two horizontal closer is neither toward or away from the safe zone center. As a result, the collar unit will deliver the first alert zone stimulus such as vibration to the dog. This may remind the dog to get back on course, causing the dog to travel to position F. Since position F is inside the assisted guidance region and in the second alert zone, the collar unit will preferably combine the comforting tone of the safe zone with a medium level vibration through position G until the dog has crossed into the safe zone, such as illustrated by position H. Once within the safe zone, the collar unit will revert from the wayward dog shepherding mode back to the initial containment mode.

Shepherding using a safe zone center is extremely fast and simple to process, thereby enabling the use of a less capable processor and fewer operating steps, both which lower cost and better preserve battery life. The safe zone center works extremely well for the vast majority of properties. Nevertheless, the safe zone center presents some undesirable behaviors with some unusual property geometries and borders. Two noteworthy geometries include properties with a very large external linear dimension, and another with a concave border.

Figure 7:
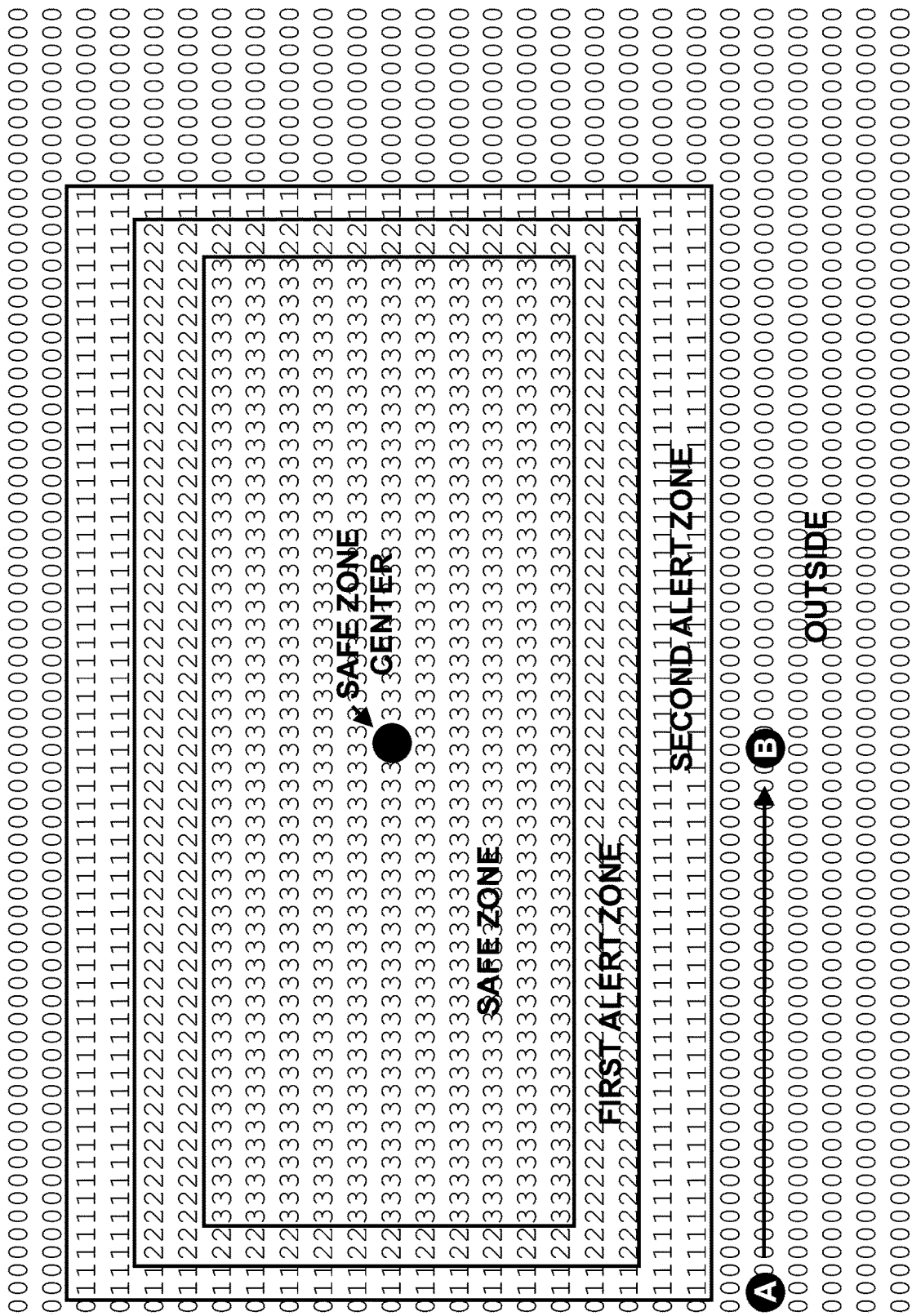
FIG. 7 illustrates by graphical representation the special case of a very large external linear dimension alert zone, and a method of reading future position guidance zone values located in a path of sequential future position guidance zone values stored in the data table, the path which never crosses into the alert zone.

FIG. 7 illustrates the special case of a very large external linear dimension, with the dog at point A and heading in the direction of point B. Travel from position A to position B is, when calculating using the safe zone center, moving closer to the center, and would therefore be considered as moving in the preferred direction. However, no matter how far the arrow of FIG. 7 extends, it is visually apparent to a person by the graphical representation of FIG. 7 that the dog on this course will never travel into the second alert zone.

In consideration of this limitation, in some preferred embodiments a different comparison will be performed. Rather than using the safe zone center, the current direction of travel can be used to read the guidance zone value stored in each data point within the data table that will be represented as being traversed by the collar if the direction of travel is maintained constant. In the preferred embodiment, the processor will be checking to see whether any non-zero guidance zone value will be traversed. If a non-zero guidance zone value will be traversed, this indicates that the dog is, in fact, returning from the out-of-bounds region and, in the exemplary and non-limiting example of using a safe zone and two alert zones, is at least headed into the second alert zone. In some alternative embodiments a value other than zero may be stored in the data table to indicate the out-of-bounds region. In such case, the processor will be looking for any value other than that value that is indicative of the out-of-bounds region.

For exemplary purpose only, and not limiting the present invention thereto, to traverse the data table representing the collar direction of travel, the slope of the line in the direction of travel is used to calculate which data point will next be traversed. For a slope of +1 vertical for every +1 shift horizontally, which we understand to be a 45 degree angle, the processor will then increment from position A one position in the horizontal or X axis, and one position in the vertical or Y axis, read the data contents, and if the contents is zero, then repeat the increments in the X and Y axes and data table read again. The path of sequential future position guidance zone values stored in the data table are read, either until a non-zero value is encountered, or until the data table is exhausted, whichever comes first. For exemplary and non-limiting purpose, the path of sequential future position guidance zone values stored in the data table are read sequentially, though in alternative embodiments other techniques to optimize the read sequence will be used as will be described for further exemplary purpose herein below.

In the case of a fractional increment, such as a slope of the processor will keep track of the fractions, but at each data point shift the processor will round the fractions to the closest whole number to determine which data point in the data table to read. In other words, and again for the two X steps for each single Y step, the first step in the X direction would lead to a one-half step in the Y direction. Even though the processor will keep track of the one-half step in the Y direction, using standard rounding rules this will cause the Y axis to increment by one as well for the data table read. Consequently, moving from point A to the next data table read will generate a shift in both the X and Y directions of one. If the value returned from the data table is zero, then the next read will be from a position shifted by one only in the X direction. This is because the processor knows the Y direction shift now totals only one position shifted, and the one-position shift has already been made. This rounding provides an accurate representation of how each new position being traversed will be detected by a position detection system such as GPS.

As alluded to above, in some alternative embodiments not every data point in the path of sequential future position guidance zone values stored in the data table is read. In one alternative embodiment, the simplest fraction representing the slope is used to offset to the next data point to be read. In other words, and again using the above example of two steps in the X direction for each step in the Y direction, rather than reading the next data point in the path that is offset in the X direction by one step, the processor will skip this data point read and proceed directly to the next data point offset, which is two steps in the X direction and one step in the Y direction. This technique eliminates the need for the processor to keep track of rounding values. While this alternative embodiment technique is beneficial for paths that follow a slope intermediate between the X and Y axis, it is nevertheless deficient as the path approaches parallel to one of the axes where a large number of data points might be skipped. Consequently, this approach of avoiding tracking of rounding numbers will preferably be vacated as the slope of the path is at or below a minimal critical angle of offset from parallel with one of the axes.

As also alluded to above, in some alternative embodiments the data points are not read sequentially. Since in the preferred embodiment the one or more alert zone values comprise a width of two data points, in these alternative embodiments every other data point will be read, and the intermediate data point will be skipped. In these alternative embodiments, all paths that would enter the outermost alert zone will still be detected, except for a path that only intersects with the very edge of the outermost alert zone. As may then be appreciated, in some alternative embodiments the number of data points skipped is directly related to the width of the alert zone, such that at least one read will occur within the alert zone. In other words, if the alert zone is three points in width, then in some alternative embodiments two data points will be skipped before the next data point is read. In some further alternative embodiments, the number of data points skipped is directly related to the size of the area circumscribed by the alert zone. In yet further alternative embodiments, both the width of the alert zone and the size of the area circumscribed by the alert zone are factored into the determination of the number of data points skipped.

In a yet further alternative embodiment, a first read of data points might read every $n^{th}$ data point, and, if all of those data point reads return an out-of-bounds guidance zone value, then another set of reads of every $n^{th}$ data point +1 position may be made, until either a value is returned that is not an out-of-bounds guidance zone value or all of the data points have been read. In other words, if the first sequential read of data points reads every third data point starting at data point 1, then the reads would occur at data points 1, 4, 7, 10, etc. If this first sequential read of data points only returns out-of-bounds guidance zone values, then a second sequential read of data points will be initiated. This second sequential read of data points will start at data point 2, and continue with data points 5, 8, 11, and so forth. If this second sequential read of data points only returns out-of-bounds guidance zone values, then a third sequential read of data points will be initiated. The third sequential read of data points will start at data point 3, and continue with data points 6, 9, 12, and so forth. As may be appreciated, conducting the aforementioned first, second, and third sequential reads of every third data point will result in all data points in the path of sequential future position guidance zone values stored in the data table being read.

In the illustration of FIG. 7, the direction of travel is entirely in the horizontal direction, or along the X axis of the data table, so a simple read of the data in the row occupied by points A and B is made to see if any of the data points in the table yield a non-zero value. Since there is no Y shift at all, the processor will simply increment the X value one position for each read, checking the data in the table for a non-zero value. Even though point B is closer to the safe zone center, the processor will read the entire row of data and not encounter a non-zero value. As a result, the collar unit will recognize that the course the dog is on will remain in the out-of-bounds region, not heading into the second alert zone, and so will deliver a second alert zone stimulus to the dog. In the preferred embodiment a second alert zone stimulus is a medium electrical stimulation, reminding the dog that it is not heading into the second alert zone.

Figure 8:
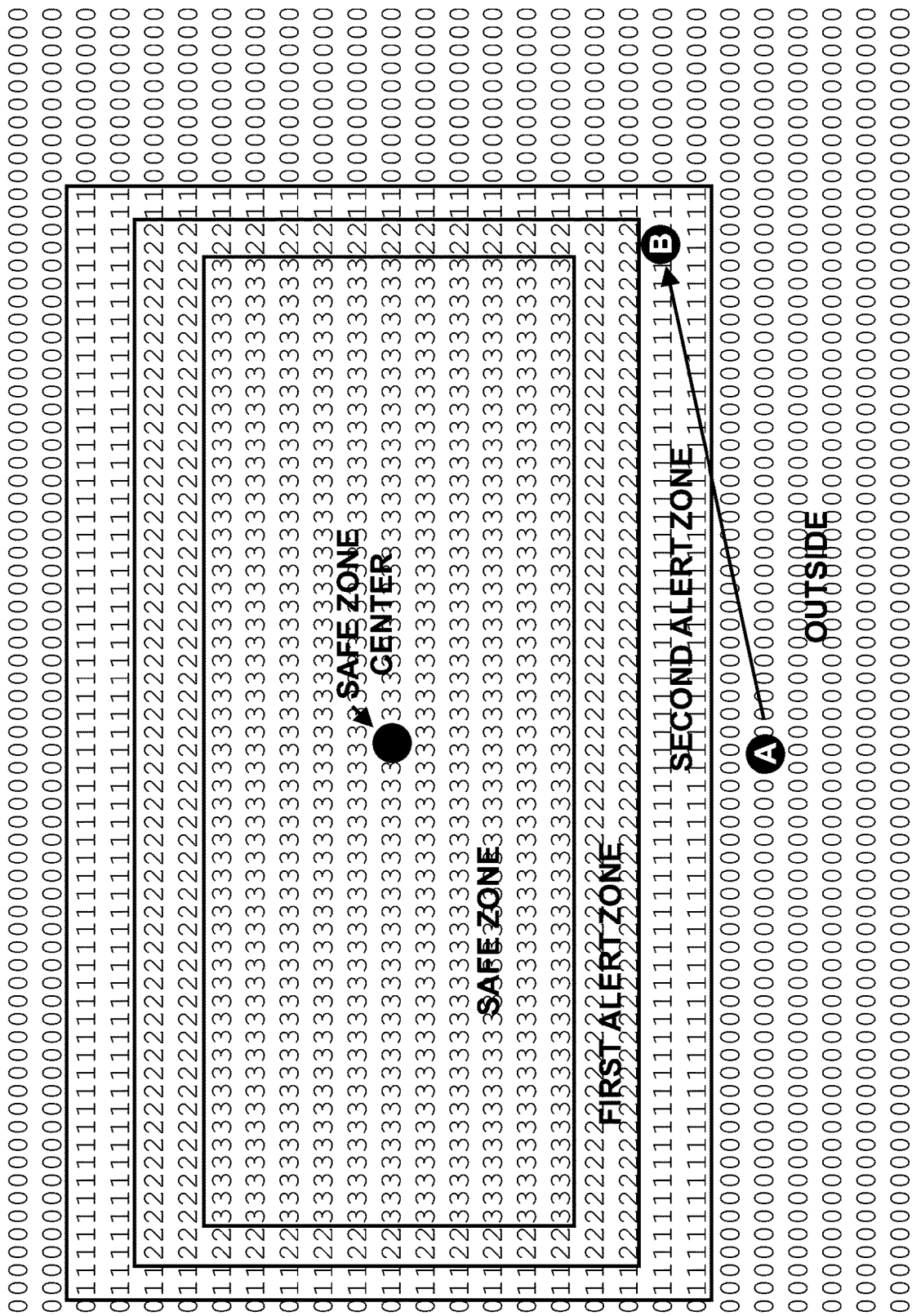
FIG. 8 illustrates by graphical representation the special case of a very large external linear dimension alert zone of FIG. 7, and the method of reading future position guidance zone values of FIG. 7 applied to a path of sequential future position guidance zone values that crosses into the alert zone.

In contrast to FIG. 7, in FIG. 8 using the same data table representing a very large external linear dimension as was used in FIG. 7, a dog travels from point A in the direction of point B. In this illustration of FIG. 8, and using the safe zone center calculation, the dog would be understood to be heading away from the safe zone center. However, using the read of the points that will be traversed in the data table, the processor will detect a non-zero data point prior to the dog reaching point B. As a result of this non-zero data read, the current direction of travel from point A toward point B is recognized as returning to the second alert zone. In such case, and detecting this movement that will intersect with a non-zero point in the data table, the collar unit will deliver the safe zone stimulus or a similar stimulus such as a rewarding tone or a rewarding recorded voice to the dog.

In both of the examples of FIGS. 7 and 8, the calculation of displacement from the closest border point, achieved by scanning of "rings" of greater displacement from a current position, would return like results as the read of the points that will be traversed in the data table.

Figure 9:
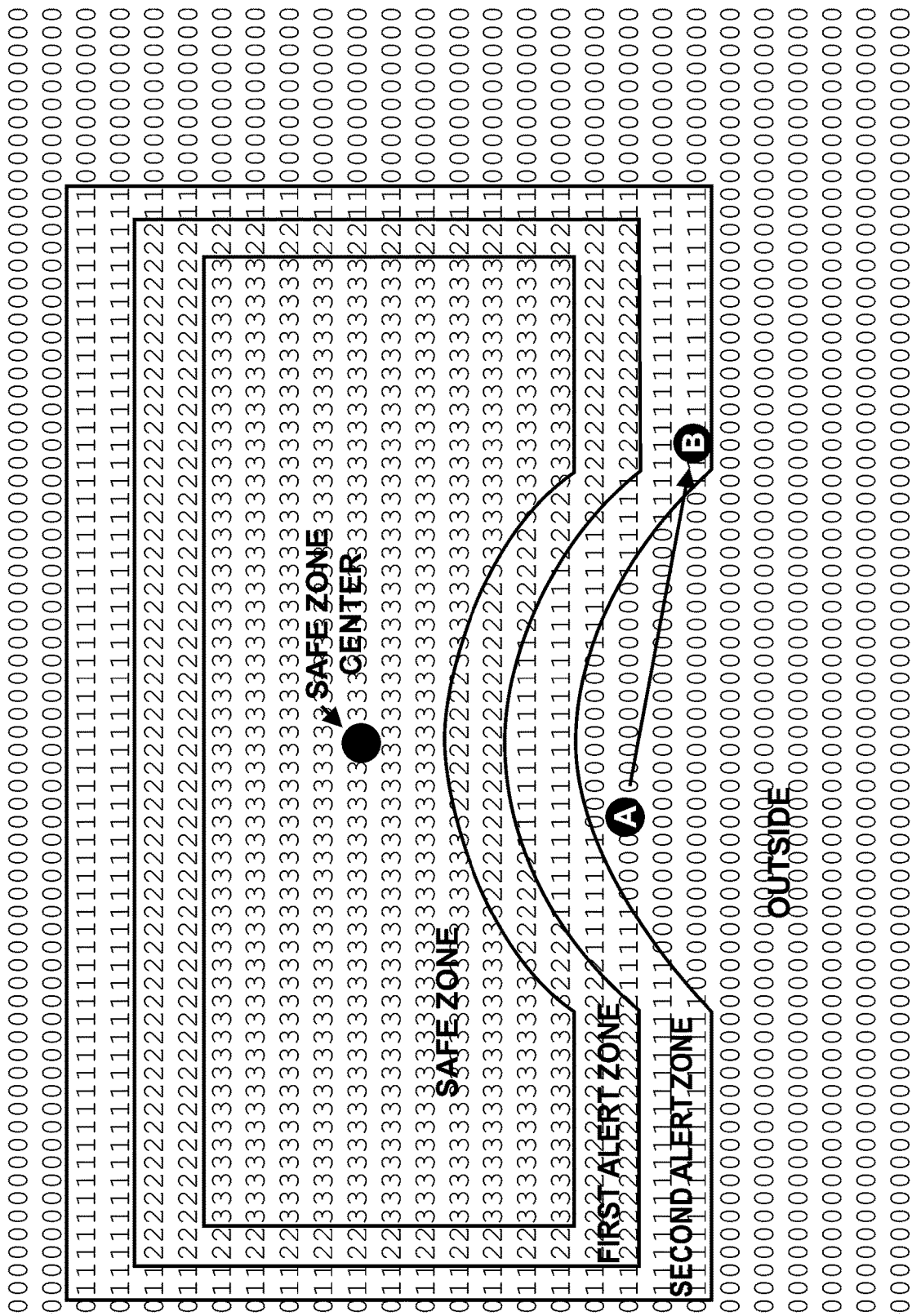
FIG. 9 illustrates by graphical representation the special case of a concave dimension alert zone, and the method of reading future position guidance zone values of FIG. 7 applied to a path of sequential future position guidance zone values that crosses into the alert zone.

FIG. 9 illustrates the special case of a concave border, with the dog at point A and heading in the direction of point B. This type of geometry is found commonly in a cul-de-sac, but may be found in other property borders as well. In this illustration, travel from position A to position B, when calculating using the safe zone center, is understood to be heading away from the safe zone center. Similarly, checking for the closest second alert zone point by scanning of "rings" will also lead to the conclusion that the dog is heading in the wrong direction. However, using the read of the points that will be traversed in the data table, the processor will detect a non-zero data point prior to the dog reaching point B. As a result of this non-zero data read, the current direction of travel from point A toward point B is recognized as returning to the second alert zone. In such case, and detecting that this movement will intersect with a non-zero point in the data table, the collar unit will deliver the safe zone stimulus or a similar stimulus such as a rewarding tone or a rewarding recorded voice to the dog.

Figure 10:
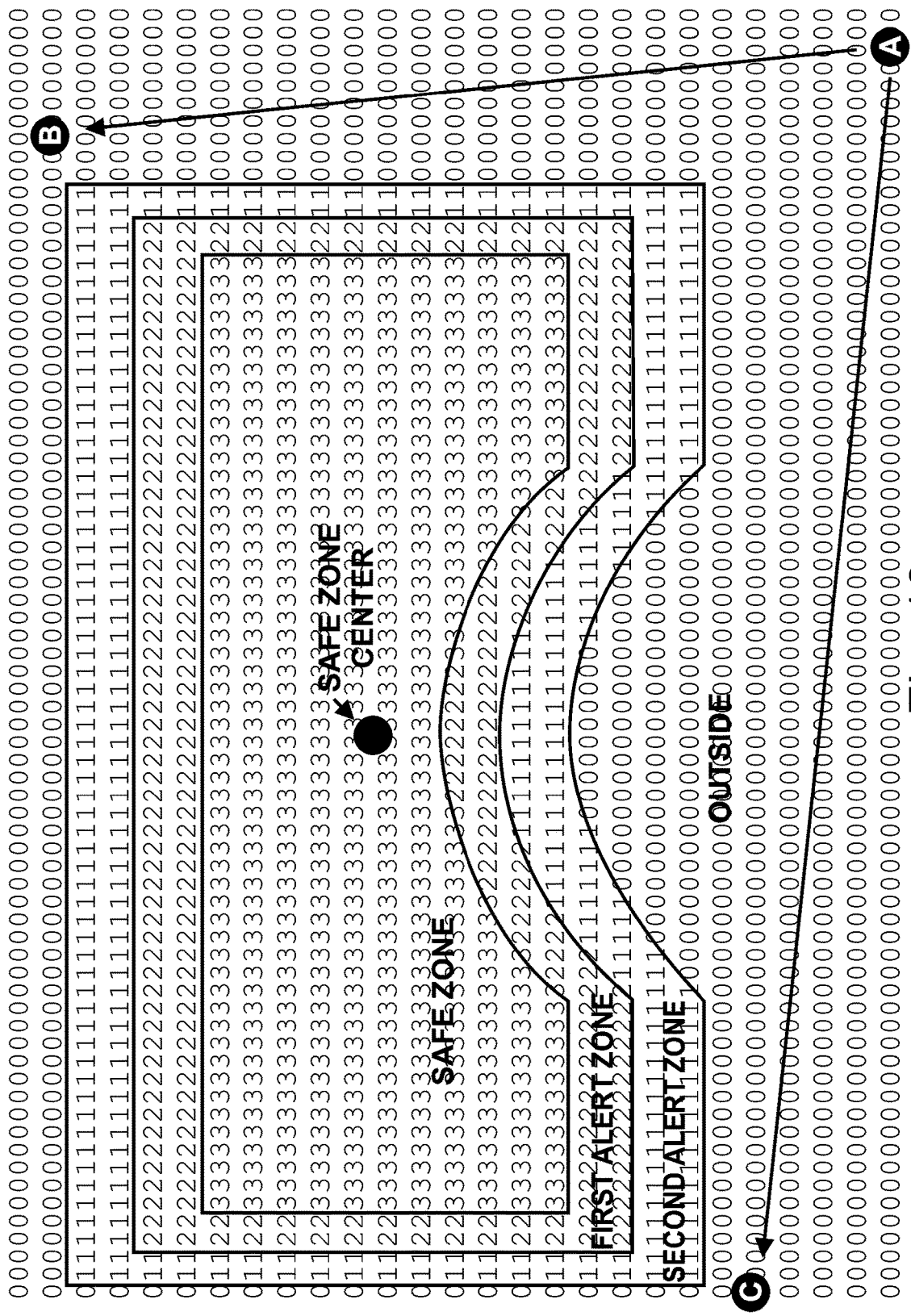
FIG. 10 illustrates by graphical representation the special case of a concave dimension alert zone of FIG. 9, and the method of reading future position guidance zone values of FIG. 7 applied to a pair of paths which never cross into the alert zone.

FIG. 10 illustrates the special case of a concave border, with the dog at point A and heading in the direction of point B. Travel from position A toward position B is, when calculating using the safe zone center, moving closer to the center, and would therefore be considered as moving in the preferred direction. Likewise, travel from position A toward position C is, when calculating using the safe zone center, moving closer to the center, and would therefore be considered as moving in the preferred direction. Similarly, a calculation of displacement from the closest border point, achieved by scanning of "rings" of greater displacement from a current position, will also yield an interpretation that the dog is heading in the right direction. However, no matter how far either arrow of FIG. 10 extends, it is clear it will never travel into the second alert zone. As a result, the collar unit will recognize that the dog is not heading into the second alert zone, and so will deliver a second alert zone stimulus to the dog, which in the preferred embodiment is a medium electrical stimulation, reminding the dog that it is not heading into the second alert zone.

Figure 11:
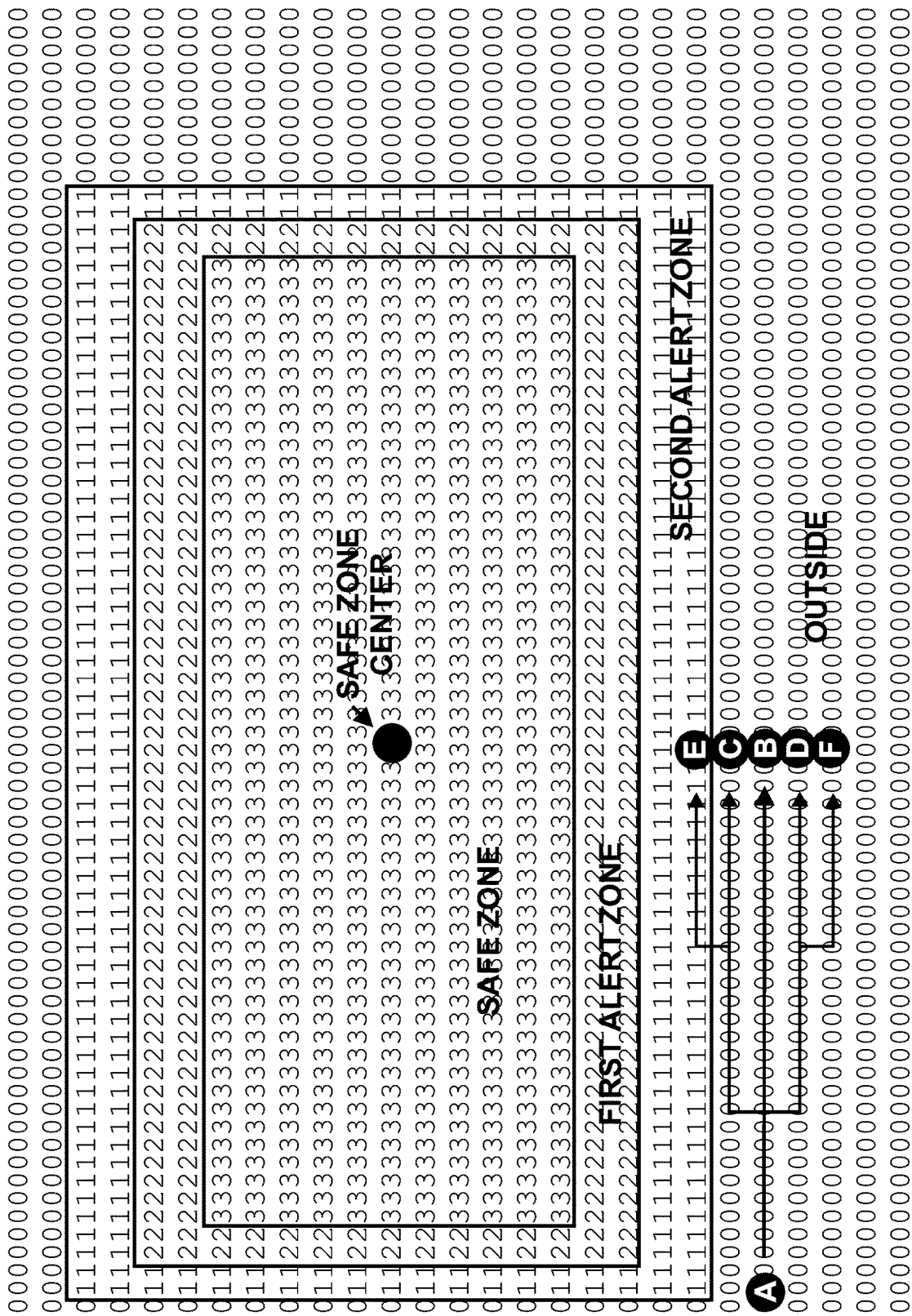
FIG. 11 illustrates by graphical representation the special case of a very large external linear dimension alert zone of FIG. 7, and the method of reading future position guidance zone values of FIG. 7 applied to a path of sequential future position guidance zone values that, in combination with an increasing band of uncertainty, crosses into the alert zone.

In the illustration of FIG. 11, and just as in the illustration of FIG. 7, the direction of travel is entirely in the horizontal direction, or along the X axis of the data table, so a simple read of the data in the row occupied by points A and B is made to see if any of the data points in the table yield a non-zero value. None yield a non-zero value. However, additional data points are read by adding an increasing band of uncertainty as the collar is predicted to travel from point A to point B. As illustrated in FIG. 11, the width of the path of sequential future position guidance zone values within the first approximately 10 data points from point A is one data point. At approximately 10 data points from point A, and continuing for another approximately 10 data points, the width of the path of sequential future position guidance zone values is increased from one data point to three data points, thereby allowing for an increased amount of uncertainty as the dog travels farther from point A. This means that the data points from point A to points B, C, and D are checked for any non-zero value. At approximately 20 data points from point A, and continuing for another approximately 10 data points, the width of the path of sequential future position guidance zone values is increased from three data points to five data points, thereby allowing for an increased amount of uncertainty as the dog travels even farther from point A. This means that the data points from point A to points B, C, D, E, and F are checked for any non-zero value. For exemplary purpose only, and not limiting the present invention thereto, particular distances from point A are illustrated in FIG. 11 to increase the width of the path of sequential future position guidance zone values, and the width of the path of sequential future position guidance zone values is increased by a particular number of data points at each of these particular distances. Nevertheless, in accord with the teachings of the present invention, both the particular distances where the width changes and the amount of increase in the path width will be determined either by initial design, by user selection, or by calculations made by the processor based upon a particular geometry of alert zone.

In some preferred embodiments of the invention, rather than relying on a single one of the safe zone center calculation, the calculation of displacement from the closest border point by scanning of "rings", or the read of future position data table contents looking for a non-zero value, two or more of these techniques are used. In such embodiments, priority may be assigned to one particular method over another depending upon training goals and upon which check is returning a result indicating a dog is returning as desired and which is returning a negative result indicating the current path is not returning.

For exemplary and non-limiting purpose, in one embodiment the read of future position data table contents is conducted first. If the read of future position data table contents indicates the dog is headed into the second alert zone, then no further checks may be required. If, however, the read of future position data table contents fails, such as with FIG. 10, then one or more of the calculation of displacement from the closest border point by scanning of "rings" and distance from safe zone center may be used to see if the dog is at least making progress in the right general direction, even if not in a direction that will intersect with the second alert zone.

Continuing for exemplary and non-limiting purpose, in another embodiment a trainer or owner might prefer the dog return to the closest border point, in which case only the scanning of "rings" will be conducted.

Consequently, in some embodiments, only the safe zone center calculation will be used. In other embodiments, only the read of future position data table contents looking for a non-zero value is used. In yet other embodiments, the selection of the type of calculation used is determined by a user selection. In even further embodiments, the selection of the type of calculation used is determined by the processor, by checking the geometry of the second alert zone outer data points to determine if there are any very large external linear dimensions or any significantly concave borders.

To reiterate previous description, determination of direction of travel has in the prior art involved distance-based calculations to the nearest border or zone, or the calculation of a velocity vector with direction which must be compared to the border vectors. Both of these calculations are inherently processor intensive, making them undesirably slow and resulting in undesirable battery drain. Instead, in accord with preferred and alternative embodiments of the invention using any of the safe zone center calculation, the calculation of displacement from the closest border point by scanning of "rings", or the read of future position data table contents looking for a non-zero value, the determination of direction of travel is intrinsically very fast and low energy, and not a processor intensive distance-based calculation.

As may be further appreciated, the present invention is also in stark contrast to the prior art techniques in the manner of training and stimuli. In the prior art, a border or electronic fence is established, and presence outside of the border or fence triggers aversive stimulus. In the present invention, the out-of-bounds zone is still referred to herein as a zone and the stimulus varied therein dependent upon the behavior of the dog. In essence, there is not a confinement fence or border, and instead an extended region of assisted behavioral guidance that is operative to alert and reward the dog.

Noteworthy herein is the understanding that while the diverse neurological stimulus channels of the preferred embodiment help to better communicate with an excited dog, this does not mean that a non-aversive system will have only gentle stimuli. It will be appreciated herein that an excited animal will not sense stimuli as well as a calm animal. In an excited state, many animals have much greater pain thresholds and many will also mute senses that are not a part of the cause of the excited state. In other words, a dog who has smelled a rabbit may not hear or feel ordinary sensations, and will only feel a gentle sensation during the excited state that might, in a calm state, be perceived as aversive. Consequently, the strength or level of the various stimuli may also be designed to factor in the level or expected level of excitation of the animal at the time of stimulation. This may include biometric or inertial sensing as well, such that a dog in the heat of a chase may receive a stronger stimulus than a dog slowly ambling about.

While three zones are illustrated within an assisted guidance region, the present invention is not solely limited to a particular number of zones within an assisted guidance region, or a particular way to represent those zones. The numerical representations from zero to three are preferred, but any other representations that may be machine stored are contemplated herein.

While the preferred embodiment table 10 has been described herein above and illustrated in FIGS. 2-4 for the purposes of enablement as cooperative with a self-contained collar apparatus such as that illustrated by Swanson et al in 2007/0204804, it should be apparent that the table 10 contents incorporating discrete values representative of various zones may be used with other apparatus such as found in many other patents incorporated herein by reference above and other systems, as will be understood and appreciated by those skilled in the art.

While the foregoing details what are felt to be the preferred and additional alternative embodiments of the invention, no material limitations to the scope of the claimed invention are intended. The variants that would be possible from a reading of the present disclosure are too many in number for individual listings herein, though they are understood to be included in the present invention. For exemplary purposes only, and not solely limiting the invention thereto, the words "dog" and "animal" have been used interchangeably herein above. This is in recognition that the present invention has been designed specifically for use with dogs, but with the understanding that other animals may also be trained using apparatus in accord with the teachings of the present invention. Consequently, the present invention is understood to be applicable to other animals, and the differences that will be required of an alternative embodiment designed for animals other than dogs will be recognized based upon principles that are known in the art of animal training. Further, features and design alternatives that would be obvious to one of ordinary skill in the art are considered to be incorporated herein. The scope of the invention is set forth and particularly described in the claims herein below.

I claim:

1. A wireless location assisted zone guidance system configured to assist in the training and management of an animal and providing an extended area of behavioral guidance, comprising:

a housing;

an electrical power source contained within said housing;

at least one animal stimulation apparatus electrically coupled with said housing and powered by said electrical power source;

a wireless location determination apparatus contained within said housing, powered by said electrical power source, and configured to operatively generate current position identifying information representative of a current position of said housing;

an electrical processor coupled to said wireless location determination apparatus and operative to receive said current position identifying information therefrom;

memory electrically accessible by said electrical processor;

a data table that is stored in said electrically accessible memory; and a plurality of guidance zone values stored in said data table, with each guidance zone value stored in said data table identifying at least a one of a safe zone associated with a first behavioral guidance stimulation, an alert zone circumscribing said safe zone associated with a second behavioral guidance stimulation different from said first behavioral guidance stimulation, and an out-of-bounds zone circumscribing said alert zone associated with a third behavioral guidance stimulation different from said first and second behavioral guidance stimulations;

said electrical processor configured to operatively compare said received current position identifying information to said data table to generate a first represented current position within said data table that is in a guidance zone circumscribing said safe zone, to initiate a stimulation by said at least one animal stimulation apparatus based upon a first guidance zone value stored in said data table at said first represented current position, and to generate a second represented current position that is subsequent to said first represented current position and to read a second guidance zone value stored in said data table at said second represented current position and further configured to vary an output of said at least one animal stimulation apparatus responsive to said second represented current position relative to said first represented current position, and further configured to determine when said housing is outside of said safe zone and said alert zone, and to control an output of said at least one animal stimulation apparatus to provide positive stimulus when said housing is determined to be outside of said alert zone and said second represented current position relative to said first represented current position is indicative of movement from said out-of-bounds zone into said alert zone;

wherein said electrical processor is further configured to read at least one future position guidance zone value located in a path of sequential future position guidance zone values stored in said data table that are defined in direction by a displacement from said second represented current position relative to said first represented current position and defined in location sequentially extending away from both of said second represented position and said first represented current position, and subsequent to said read of said at least one future position guidance zone value, said electrical processor is configured to compare said read at least one future position guidance zone value with said guidance zone value representing said out-of-bounds zone, and responsive to said compare if said read at least one future position guidance zone value does not equal said guidance zone value representing said out-of-bounds zone to determine that said second represented current position relative to said first represented current position is indicative of movement from said out-of-bounds zone into said alert zone.

2. The wireless location assisted zone guidance system configured to assist in the training and management of an animal and providing an extended area of behavioral guidance of claim 1, wherein said electrical processor is configured to operatively deliver a stimulus different from said positive stimulus when said housing is outside of said at least two assisted guidance zones and said second represented current position relative to said first represented current position is indicative of movement in a direction that will remain outside of said alert zone.

3. The wireless location assisted zone guidance system configured to assist in the training and management of an animal and providing an extended area of behavioral guidance of claim 1, wherein said electrical processor is further configured to read each future position guidance zone value located in said path of sequential future position guidance zone values stored in said data table until a first one of said read future position guidance zone values does not equal said guidance zone value representing said out-of-bounds zone.

4. The wireless location assisted zone guidance system configured to assist in the training and management of an animal and providing an extended area of behavioral guidance of claim 1, wherein said electrical processor is configured to read every nth future position guidance zone value located in said path of sequential future position guidance zone values stored in said data table starting at a starting future position guidance zone value, until a first one of said read future position guidance zone values does not equal said guidance zone value representing said out-of-bounds zone.

5. The wireless location assisted zone guidance system configured to assist in the training and management of an animal and providing an extended area of behavioral guidance of claim 4, wherein said electrical processor is configured to read every nth future position guidance zone value located in said path of sequential future position guidance zone values stored in said data table starting at a second starting future position guidance zone value offset from said starting future position guidance zone value by less than n future position guidance zone values, until a first one of said read future position guidance zone values does not equal said guidance zone value representing said out-of-bounds zone.

6. The wireless location assisted zone guidance system configured to assist in the training and management of an animal and providing an extended area of behavioral guidance of claim 4, wherein said electrical processor is configured to set a value for n that is equal to a width of said alert zone.

7. The wireless location assisted zone guidance system configured to assist in the training and management of an animal and providing an extended area of behavioral guidance of claim 3, wherein said electrical processor is configured to read every data point located in said path of sequential future position guidance zone values stored in said data table sequentially, until a first one of said read future position guidance zone value does not equal said guidance zone value representing said out-of-bounds zone.

8. The wireless location assisted zone guidance system configured to assist in the training and management of an animal and providing an extended area of behavioral guidance of claim 1, wherein said path of sequential future position guidance zone values stored in said data table comprises a linear path.

9. The wireless location assisted zone guidance system configured to assist in the training and management of an animal and providing an extended area of behavioral guidance of claim 1, wherein said path of sequential future position guidance zone values stored in said data table defines a path longitudinal axis and a path width transverse to said longitudinal axis, and said path width increases as the distance from said second represented current position increases, thereby allowing for an increased amount of uncertainty farther from said second represented current position.

10. The wireless location assisted zone guidance system configured to assist in the training and management of an animal and providing an extended area of behavioral guidance of claim 1, wherein said electrical processor is configured to operatively deliver a positive stimulus to said at least one animal stimulation apparatus when at least one of
    said second guidance zone value relative to said first guidance zone value and
    said future position guidance zone value relative to said second guidance zone value is indicative of movement toward said safe zone.

11. The wireless location assisted zone guidance system configured to assist in the training and management of an animal and providing an extended area of behavioral guidance of claim 10, wherein said positive stimulus comprises said first behavioral guidance stimulation.

12. The wireless location assisted zone guidance system configured to assist in the training and management of an animal and providing an extended area of behavioral guidance of claim 1, wherein said electrical processor is configured to operatively deliver through said at least one animal stimulation apparatus a stimulus responsive to at least two techniques to determine predictive intent.

13. The wireless location assisted zone guidance system configured to assist in the training and management of an animal and providing an extended area of behavioral guidance of claim 1, wherein said electrical processor is configured to operatively deliver through said at least one animal stimulation apparatus a stimulus responsive to a geometry of at least one guidance zone.

* * * * *